United States Patent [19]

Oshima et al.

[11] 4,374,403
[45] Feb. 15, 1983

[54] MAGNETIC RECORDING AND REPRODUCING SYSTEM

[75] Inventors: Mitsuaki Oshima, Kyoto; Yutaka Neichi, Nara; Atsushi Iga, Takatsuki; Ryoichi Wada, Habikino, all of Japan

[73] Assignee: Matsushita Electric Industrial Co., Ltd., Osaka, Japan

[21] Appl. No.: 162,611

[22] Filed: Jun. 24, 1980

[30] Foreign Application Priority Data

Jun. 27, 1979 [JP] Japan .................................. 54-82153
Aug. 24, 1979 [JP] Japan .................................. 54-108291

[51] Int. Cl.³ .............................................. G11B 5/12
[52] U.S. Cl. ................................ 360/113; 360/110
[58] Field of Search ................... 360/111–113; 365/131

[56] References Cited

U.S. PATENT DOCUMENTS

| | | | |
|---|---|---|---|
| 3,125,745 | 3/1964 | Oakland | 365/131 |
| 3,188,613 | 6/1965 | Fedde | 365/131 |
| 3,451,793 | 6/1969 | Marsushita | 365/131 |
| 3,456,250 | 7/1969 | Barcaro et al. | 360/111 |
| 3,526,899 | 9/1970 | Speliotis et al. | 360/113 |
| 3,633,188 | 1/1972 | Bittman | 360/111 |
| 3,921,218 | 11/1975 | Kayser | 360/113 |
| 4,164,770 | 8/1979 | Jeffers | 360/111 |
| 4,190,871 | 2/1980 | Walraven | 360/113 |

*Primary Examiner*—Vincent P. Canney
*Attorney, Agent, or Firm*—Wenderoth, Lind & Ponack

[57] ABSTRACT

A magnetic recording and reproducing system having a magnetic switching device of the thin film type which is disposed in a magnetic head and composed of a layer which is made of a magnetic material having a low coercive force and a layer which is made of a magnetic material having a high coercive force both layers are premagnetized by a magnetizing means; the magnetic switching is effected in the magnetic switching device in response to a magnetic recorded signal located on a facing magnetic recording media so that the magnetic switching is detected as a pulse voltage by means of a detecting coil which is wound around the magnetic switching device, so as to thereby generate a reproduced output corresponding to the recorded signal.

24 Claims, 106 Drawing Figures

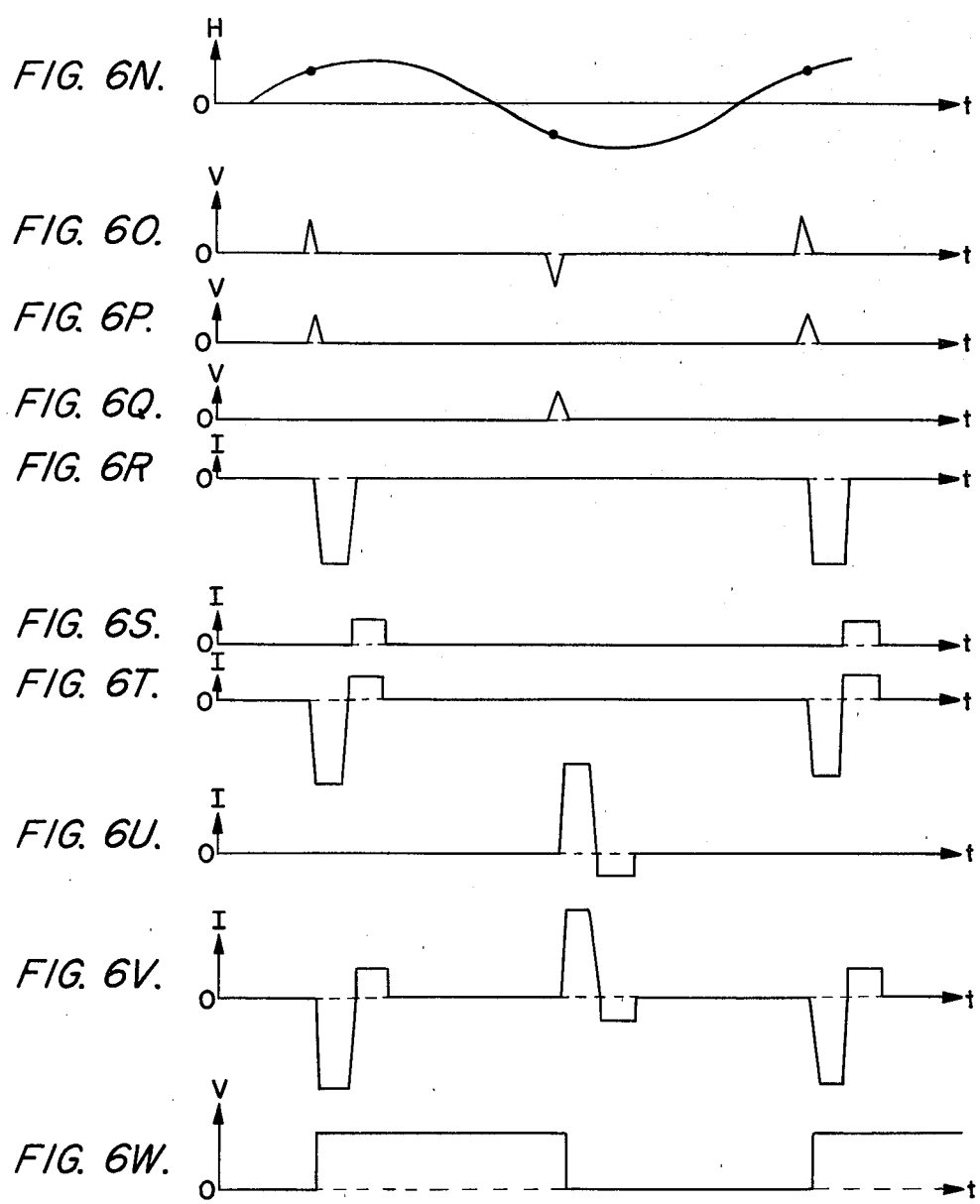

MAGNETIC RECORDING AND REPRODUCING SYSTEM

BACKGROUND OF THE INVENTION

1. Field of the Invention

The present invention relates to a magnetic recording and reproducing system, and more specifically, to a high density magnetic recording operation, and still more particularly to a perpendicular magnetic recording operation.

2. Description of the Prior Art

A variety of systems have been designed so as to use a magnetic head for a magnetic recording and reproducing system according to the prior art. The magnetic heads according to the prior art can be classified in accordance with the output types into a magnetic flux differential type and a magnetic flux response type and in accordance with the the signal processing modes into an analog signal recording type and a digital signal recording type.

First of all, the magnetic flux differential type magnetic head can be represented by a ring type head. This head was invented in 1935 by E. Schüller of Germany. Ever since, many improvements have been made so that the ring type head occupies a major role in the magnetic head field at present. Since the output voltage of the ring type head is expressed by dl/dt so that it is proportional to the changing rate of the magnetic flux with respect to time, a high output voltage can be obtained in the case of an analog type video tape recorder, in which the relative velocity between a magnetic recording medium and the magnetic head is high. In the case of a multi-track type PCM recorder, however, in which the relative velocity is low so that the changing rate of the magnetic flux with respect to time is low, the signal level approaches the level of noise such as the Barkhausen noises which are generated in the magnetic material of the magnetic head, thus making it difficult to reproduce the original signal. Therefore, the magnetic flux differential type magnetic head has its application limited to the use having at least a preset minimum changing rate of the magnetic flux with respect to time. In the application of the magnetic recording of a region wherein the changing rate of the magnetic flux with respect to time is low, the magnetic flux response type magnetic head is used, including a variable reluctance type head, a Hall element head and a magneto-resistance element head. These are heads for reproduction only, but they respond to the quantity of the magnetic flux so that they can reproduce magnetic recorded signals of low frequency containing a DC component. Therefore, the magnetic flux response type magnetic heads are suitable for application in the digital signal recording and reproducing apparatus, in which the reproducing rate is minimized by the use of the multiple tracks while having a low changing rate of magnetic flux with respect to time. However, the variable reluctance type head has a complex construction, and the Hall element head and the magneto-resistance element head require a bias current and a bias magnetic field, although their high frequency characteristics are excellent and their construction is simple, so that their S/N ratio is deteriorated by noise such as the Barkhausen noises. Because of the deteriorated S/N ratio, the magnetic flux response type magnetic head according to the prior art has its application limited to a low density system, even in the magnetic recording of the system having a low changing rate of the magnetic flux with respect to time, so that it is not suitable for the high density recording purpose which is being required from the market at present.

Now, the magnetic heads can be roughly classified in accordance with the signal processing modes into the digital signal recording system and the analog signal recording system, as has been described hereinbefore. The digital system has conventionally been used for industry, e.g., in a computer as well as widely used for home use, e.g., in a PCM tape recorder. In this meaning, it can be said that the significance of the digital magnetic recording and reproducing apparatus has been abruptly raised so that the developments for high density recording purposes are being accomplished in many companies.

Here, the conventional digital magnetic apparatus is different from the analog magnetic recording apparatus only in that the recording operation is effected while saturating the magnetization of the magnetic layer of the magnetic recording medium. It is not too much to say that the basic construction such as the reproducing or recording head follows the analog magnetic recording technique. In the reproducing circuit, on the other hand, it is the current practice that the continuously varying analog signals generated in the magnetic head are amplified by an analog signal and converted into digital signals. Although it is of the digital magnetic recording type, it is not greatly different from the magnetic recording mechanism of the analog magnetic recording in view of the output signal generation from the ring type magnetic head.

According to the conventional system, therefore, the advantages of the digital processing system are not sufficiently utilized so that it has been difficult to realize the higher density recording operation than the analog magnetic recording operation.

As a method suitable for the high density magnetic recording operation of the digital signals, on the other hand, a perpendicular magnetic recording system has been proposed so that the high density magnetic recording operation as high as 100 MBPI is realized.

In case, however, the high density recorded signals are to be reproduced, the record magnetizing signal of one wavelength is so fine as to require a remarkably highly sensitive magnetic head. However, the magnetic head having been realized has not been put into practice because it is short of sensitivity.

As has been described hereinbefore, the magnetic recording operation of the remarkably high density has been realized. Since, however, a detecting system of high sensitivity for reproducing the high density magnetic recorded signals is not realized, the advent of the magnetic detecting system having the higher sensitivity than that of the prior art has been awaited.

In case the higher density is to be realized, it becomes necessary to raise the track density. In this case, the tracking resorting to the magnetic head drive by an electromagnetic actuator becomes necessary. In this respect, as the weight of the magnetic head becomes the lower, the tracking becomes the easier so that the track density can be accordingly raised. Thus, a magnetic recording and reproducing system which has a lighter magnetic head without any reduction in the output voltage has been required.

SUMMARY OF THE INVENTION

It is therefore an object of the present invention to provide a magnetic recording and reproducing system, in which an output voltage of sufficient level can be generated when reproduction is effected from the high density magnetic recorded signals recorded in a remarkably fine region of a magnetic recording medium.

Another object of the present invention is to provide a magnetic recording and reproducing system, in which the magnetic head is so small and light that its mechanical tracking can be remarkably simplified.

Still another object of the present invention is to provide a high density magnetic recording and reproducing system which is equipped with such a magnetic head as can have its magnetic switching device and detecting coil produced by a thin film process and as can be produced at a low cost suitable for massproduction.

A further object of the present invention is to provide a magnetic recording and reproducing system which is equipped with such a magnetic head as has a suitable construction for reading the magnetic recorded signals out of a perpendicular magnetic recording medium.

A further object of the present invention is to provide a magnetic recording and reproducing system which is constructed of a perpendicular magnetic recording magnetic head having main and auxiliary magnetic poles composed of magnetic switching devices so that the recording and reproducing operations can be performed with the use of the single head.

BRIEF DESCRIPTION OF THE DRAWINGS

and FIGS. 6(N) to (W) are charts illustrating waveforms of the respective portions.

DESCRIPTION OF THE PREFERRED EMBODIMENTS

Figure 1A:
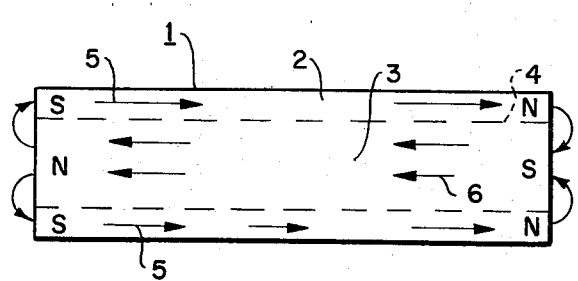
FIG. 1(A) is a sectional view showing one example of a Wiegand Wire type magnetic switching device.

The present invention relates to a magnetic recording and reproducing system of the type, in which a pulse output at a sufficient level for detection is generated from a high density magnetic recorded signal in very small area by combining a magnetic switching device made of a magnetic thin film, a magnetic detector and magnetizing means for magnetizing the magnetic switching device.

In accordance with the present invention, in order to generate a high pulse voltage, the jumping phenomena in the magnetizing curve of a magnetic element, which are seen in such Barkhausen effects as have been processed as noises in the conventional magnetic recording magnetic head so that the developments have been directed to reduce the noises, are positively utilized so that the jumping phenomena of the magnetization curve of a large amplitude may be induced in the magnetic switching device in the magnetic head to thereby effect the instantaneous switching of the magnetic flux, i.e., the high speed magnetic switching, whereby the pulse voltage is generated by magnetic detecting means such as a detecting coil.

A Wiegand wire has been widely known as a material which exhibits the steeply rising characteristics in its magnetization curve, i.e., its magnetic switching characteristics.

The Wiegand wire is prepared by imparting a mechanical torsion to a magnetic wire made of a high speed magnetic switching material while subjecting the same to a heat treatment so that a portion having high coercive force and a portion having low coercive force are stepwise distributed outside and inside, respectively, and fixed. Since the magnetic switching takes place all at once, a detecting coil output is differentiated, if it is used as the magnetic detector, so that a pulse voltage having a remarkably narrow and high turnover level is generated.

At present, the Wiegand wire thus prepared has its application limited to a use, where a high pulse voltage output of several volts is used while dispensing with an amplifier for the detected output voltage, e.g., an igniter for an automobile or a credit card. In other words, there is no application, in which means for amplifying the detected output is used, i.e., a magnetic detecting method for generating the fine voltage output, e.g., the magnetic detecting system for the magnetic recording and reproducing system.

This is because the system having excellent characteristics using a ring type head, a Hall element and a magnetic resistance element has been established in the magnetic detecting system for generating the fine detected output voltage. For instance, if the application of the Wiegand wire to the magnetic recording and reproducing system is to be considered, its application to the magnetic head of the magnetic recording and reproducing system has never been examined in view of the fact that there is apparently no merit because it is not essentially suitable for the horizontal magnetic recording system, because no output other than the pulse output can be generated and because there is a limit in the scale-down by the producing method of twisting the magnetic wire.

Recently, however, it has been confirmed that a magnetic thin film, which is composed of a layer made of a magnetic material having a high magnetic coercive force and a layer made of a magnetic material having a low magnetic coercive force, exhibits the magnetic switching characteristics similar to those of the Wiegand wire. On the other hand, the aforementioned perpendicular magnetic recording system has its characteristics improved for the recording purpose.

The present invention relates to a magnetic recording and reproducing system of the type, in which the magnetic switching device of that magnetic thin film type is disposed in the magnetic head and in which magnetizing means for magnetizing the magnetic switching device is disposed to provide a highly sensitive and light magnetic head portion, and is suitable for a perpendicular magnetic recording and reproducing system.

In the case of the present invention, although it is possible to use the magnetic switching device having the shape of the Wiegand wire, there is a limit for the scale-down. For this purpose, the system using the thin film type magnetic switch is more advantageous. The present invention is more effective in case the magnetic thin film is used, but the difference between the thin film type magnetic switching device and a rod-shaped magnetic switching device such as the Wiegand wire resides only in the physical shape but not in its electric characteristics. In the present Specification, in order partly to allow the reader to understand the present invention without difficulty and partly to omit the explanation, the present invention will now be described in detail by using the Wiegand wire as the magnetic switching device the characteristics thereof being well known in the art.

For reference, description will be made upon the Wiegand wire which is used to explain the operations of the magnetic switching device. The detail of the Wiegand wire is disclosed in Japanese Laid-Open Patent Publication No. 53-137641 and U.S. Pat. No. 3,820,090. The magnetic switching device thus disclosed is composed of a core made of a highly magnetically permeable material having a relatively low magnetic coercive force and a shell made of a highly magnetically permeable material having a relatively high magnetic coercive force and having an axis of easy magnetization. In short, the magnetic switching device has a two-layer construction which is composed of magnetically hard and soft layers.

Figure 1B:
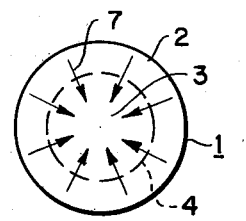
FIG. 1(B) is a side elevation of the same.
Figure 2:
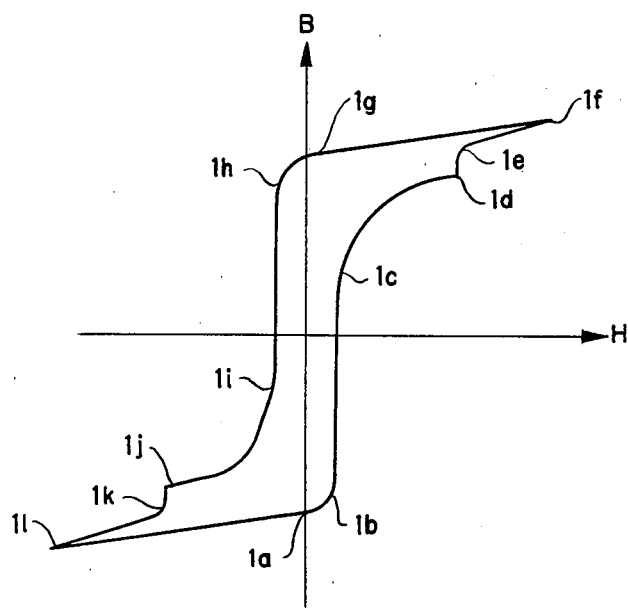
FIG. 2 is a magnetization hysteresis curve of the same.

The general explanation of the magnetic switching device will be made with reference to the accompanying drawings. FIG. 1(A) is a sectional view showing a Wiegand Wire type magnetic switching device; FIG. 1(B) is a side elevation of the same; FIG. 2 is a chart illustrating the B-H curve of the same; and FIGS. 3(A), (B), (C) and (D) are views illustrating the four kinds of magnetized conditions of the core and shell.

Figure 3A:
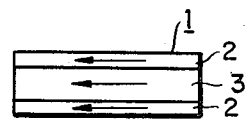
FIGS. 3(A), (B), (C) and (D) are views showing four magnetized conditions of the same.
Figure 3B:
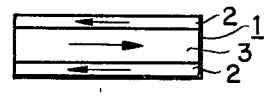
Figure 3C:
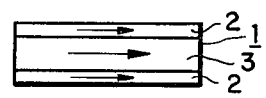
Figure 3D:
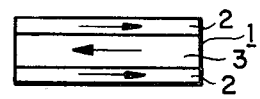

In FIGS. 1(A) and (B): numeral 1 indicates a magnetic switching device; 2 a shell made of a layer having a high magnetic coercive force; 3 a core; and 4 a magnetic interlayer disposed in the boundary between the shell 2 and the core 3. Numerals 5 and 6 indicate the directions of magnetization of the shell 2 and the core 3, respectively. Numeral 7 indicates the flow of magnetic flux at an end face, which is directed from the shell 2 to the core 3. FIGS. 3(A), (B), (C) and (D) illustrate the four conditions, under which the core 3 and the shell 2 are magnetized in the negative direction, under which the core 3 and the shell 2 are in the positive and negative directions, respectively, under which the core 3 and the shell 2 are in the positive direction, and under which the core 3 and the shell 2 are in the negative and positive directions, respectively. Moreover, arrows indicate the directions of magnetization.

The operating principles will be described in the following. As shown in FIG. 1, since the magnetic switching device is of magnetic two-layer construction composed of the core 3 and the shell 2 and since it has an axis of easy magnetization, the core 3 and the shell 2 are magnetized in either a positive or negative direction. As a result, there exists any one of the combinations of the four magnetizations shown in FIG. 3. These four magnetization conditions can be roughly classified into two conditions, under which the core 3 and the shell 2 are magnetized in the same direction and under which the core and the shell 2 are magnetized in the opposite directions. Since the magnetic switching device has the axis of easy magnetization, it can be said to have two stational states, in which both the two magnetizations in the same direction and in the opposite directions exist as the stable conditions. The condition in the opposite directions has a lower energy than that in the same direction, similarly in the other magnetic structure.

Now, the magnetizing process will be described in the following. First of all, if the magnetic switching device 1 is under the magnetized condition indicated at point 1a of the B-H curve of FIG. 2, the shell 2 having the relatively high magnetic coercive force restricts the core 3 having the relatively low magnetic coercive force. In case the magnetic flux impressed is small, the core 3 and the shell 2 are held in the same magnetized direction while being kept from having their directions switched. When the magnetic field higher than a preset level is applied at point 1b, the magnetized direction of the core 3, which has been restricted by the shell 2 by that time, is instantly switched from the point 1b to point 1c. This is called "the switching of the core in the opposite direction". At this time, the high speed switching phenomena of the magnetic flux are found, and the magnetic switching time is determined by the shape of the magnetic switching element. This means that the moving of the magnetic wall is consecutively accomplished from end to end so that the magnetic switching time is determined by the propagation time of the moving magnetic wall. Therefore, the dependency of of the external magnetic field upon the changing rate to time is very low. This is featured by the Wiegand effects. The jumping phenomena from the point 1b to the point 1c are understood to result from that the Barkhausen effects take place all at once. These phenomena are called "the primary Jump".

If the magnetic field in the positive direction is then strengthened, the magnetized condition is shifted from the point 1c to point 1d. This region is the rotational magnetized region which is found in a general magnetic material. When the external magnetic field reaches the level of the point 1d, the magnetization of the shell 2 having a relatively high magnetic coercive force is then gradually switched so that a "secondary jump" takes place to point 1e. At this time, since the core 3 and the shell 2 are magnetized in the same direction, the small jump is called "the magnetization switching in the same direction", which will be called "the secondary jump" in the following. The shift from the point 1e to point 1f is the rotational magnetization region so that the magnetic switching device reaches the saturated region at the point 1f. At this point 1f, if the magnetic field is weakened, another locus is drawn until point 1g is reached. The value of the magnetic flux at this point 1g exhibits the residual magnetic flux.

As the magnetic field in the opposite direction is strengthened from the point 1g, the high jumping phenomena are found again at point 1h until point 1i is reached. At this time, since the core 3 is switched in the opposite direction to the shell 2, these phenomena are called "the magnetic switching in the opposite direction". In short, the primary juming phenomena from the point 1b to the point 1c are similar to the jumping phenomena from the point 1h to the point 1i so that the B-H curves can be said symmetrical with respect to the origin. Therefore, the small jump from point 1j to point 1k correspond to "the magnetic switching in the same direction" from the point 1d to the point 1e, i.e., the secondary jump so that the point 1f corresponds to point 1l. As the magnetic field is weakened, the point is shifted from 1l to 1a, thus drawing the hysterisis curves which are symmetrical with respect to the origin.

In FIG. 2, incidentally, the curves are drawn in solid lines between the points 1b and 1c, 1d and 1e, 1h and 1i and 1j and 1k. If the B-H curves are actually observed with the use of an oscilloscope, the switching time is so fast that nothing but the remarkably thin locus can be observed as if it jumped.

If a coil is wound on the magnetic switching device having such jumping characteristics, the magnetic flux is switched at a high speed so that its changing rate with respect to time becomes remarkably high. As a result, a remarkably high voltage can be generated on the basis of the theoretical equation of electromagnetic induction expressed by $V \alpha d\rho/dt$.

As has been described before, the level of the pulse voltage is determined by the shape of the material but is independent of the changing rate of the external magnetic field to time.

As a result, the Wiegand Wire type magnetic switching device generates the pulses at a preset voltage in response to the preset positive or negative magnetic level, although it is essentially of the magnetic flux differential type magnetic detector of detection coil type, and responds to the magnetic flux even if the change in the magnetic flux is approximately at zero so that it has the same function as that of the magnetic flux response type magnetic detector.

With the characteristics thus far described, the Wiegand effect element is practised at present in an engine igniter for an automobile or a card reader.

For reference, the application of the Wiegand wire will be described in the following.

In the case of the engine igniter, a coil having 2600 turns is wound on the Wiegand effect element having a diameter of 0.3 mm and a length of 30 mm. In case the asymmetrical drive for alternately applying a high positive magnetic field and a low negative magnetic field is performed, an output pulse voltage of 8 volts is generated. Since the thyristor can be subjected to the direct gate control at that voltage, the igniting circuit including a current device can be largely dispensed with.

In the case of the application to the card reader, on the other hand, two tracks are formed in the credit card, and the magnetic switching device is binarily coded and embedded. Moreover, magnets are so arranged that positive and negative magnetic fields are applied upon insertion of the card. Thus, the pulses resulting from the "primary jump", which has been described with reference to FIG. 2, are generated so that the digital signals may be reproduced by the demodulating circuit.

Since, in this instance, the high output pulse magnetic field is generated, it is possible to effect the contactless read-out, by which a sufficiently high output can be produced without any contact.

For production, a wire of an alloy known under the trade name of "Bicaloy" is alternately turned to the right and left so that a torsional strain may be applied thereto. As a result, such a wire can be prepared as has a magnetically two-layered construction and as has a low magnetic coercive force at its inside and a high magnetic coercive force at its outside. This condition is fixed by the heat treatment to prepare the Wiegand wire type magnetic switching device.

As has been described hereinbefore, since the magnetic switching device can be prepared merely by applying the torsional strain to the wire and by subjecting the wire to the heat treatment, it can be produced as the composite magnetic material.

According to the present invention, the magnetic switching device having the magnetic switching phenomena such as that Wiegand wire is applied to the regions of the fine signal, which is to be accommodated in the magnetic head, i.e., to the magnetic recording and reproducing system by composing the magnetic switching device of magnetic thin or thick films. Since the magnetic switching device according to the present invention has its shape decreased and its additional value enhanced, there is no limitation in the material, production method and shape of the magnetic switching device so that the most proper combination can be selected.

The detail of the magnetic switching device will now be described with reference to the accompanying drawings. Incidentally, the exterior views of both the magnetic recording and reproducing system as a whole and the driving mechanism of the magnetic recording medium are omitted, but the magnetic head, the modulating circuit and the magnetizing circuit constituting the points of the present invention will be described.

[EMBODIMENT 1]

Figure 4A:
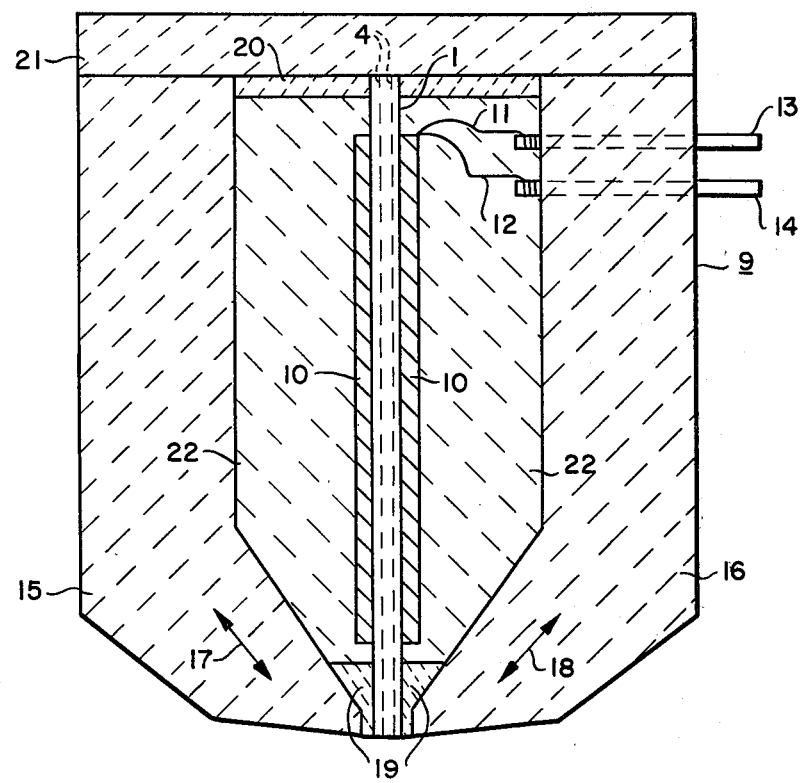
FIG. 4(A) is a sectional view showing one embodiment of the magnetic head of a magnetic recording and reproducing system according to the present invention.
Figure 4B:
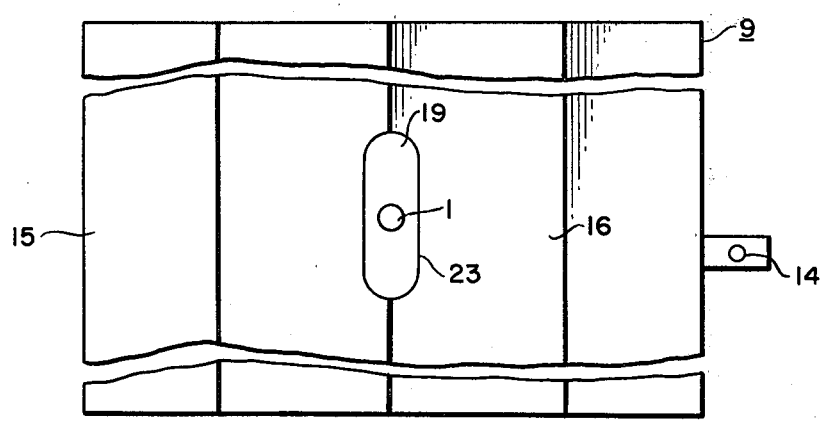
FIG. 4(B) is a side elevation showing the front portion of the same.
Figure 4C:
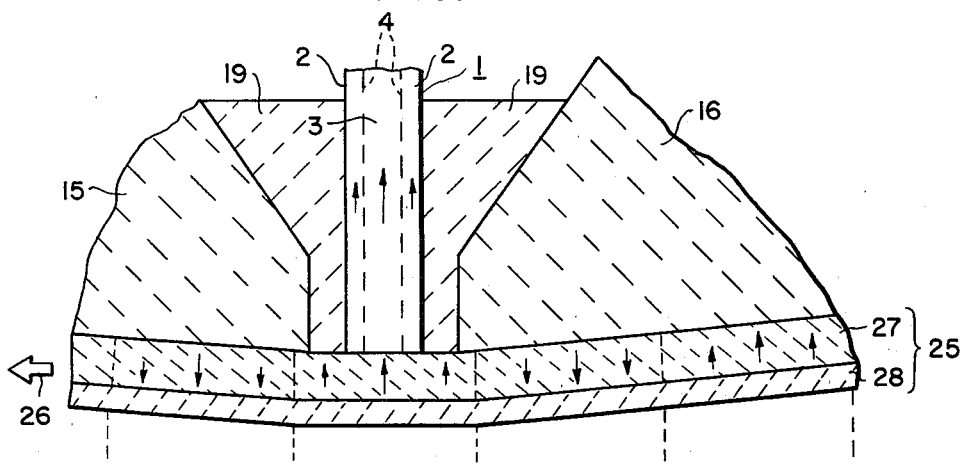
FIG. 4(C) is a sectional view showing an essential portion in an enlarged scale for illustrating the relationship with a perpendicular magnetic recording medium.
Figure 4D:
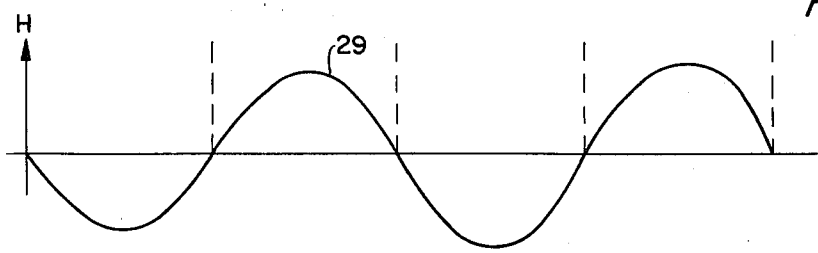
FIG. 4(D) is a chart showing the magnetization distribution on the perpendicular magnetic recording medium.
Figure 4E:
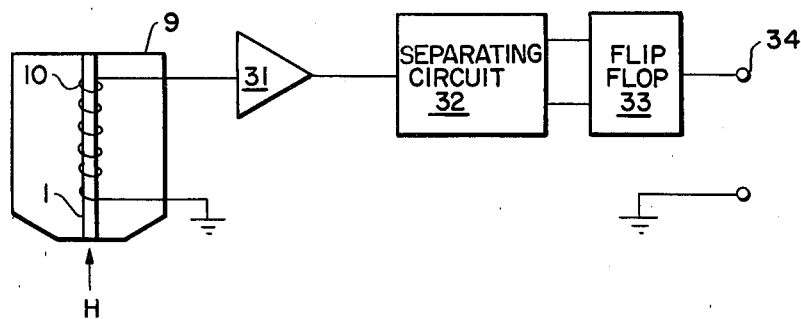
FIG. 4(E) is a block diagram showing the construction of a demodulating circuit using the first embodiment.
Figure 4F:
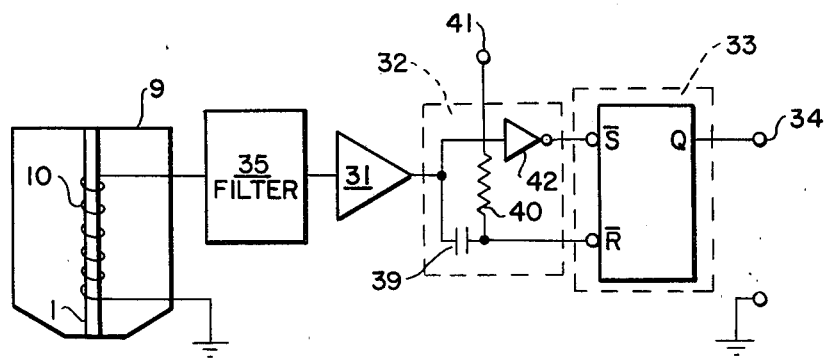
FIG. 4(F) is a circuit diagram of the same.
Figure 4G:
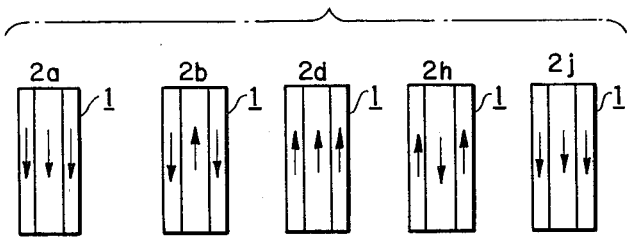
FIG. 4(G) is views illustrating the magnetized conditions of a magnetic switching device.
Figure 4H:
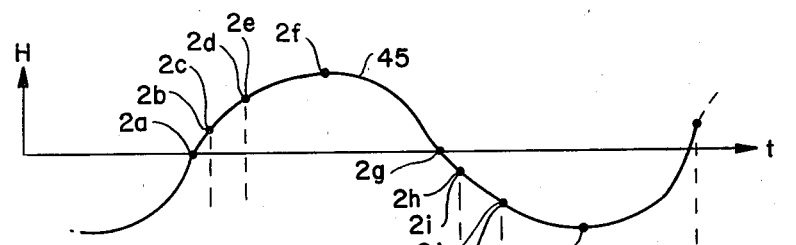
FIGS. 4(H), (I), (J) and (K) are charts showing the signal waveforms at the respective portions of a demodulating circuit.
Figure 4I:
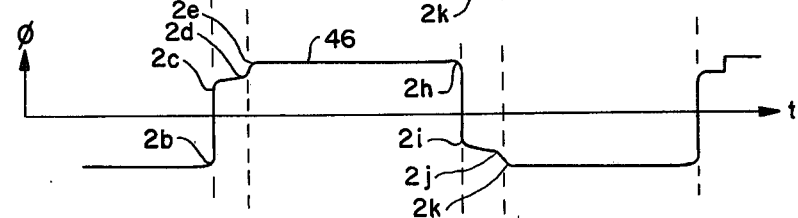
FIG. 4(L) is a chart illustrating the frequency spectrum of the pulses generated by the magnetic switching device.
FIG. 4(M) is a chart illustrating the pass band characteristics of a saw filter.
FIG. 4(N) is a block diagram showing a FM demodulating circuit.
FIG. 4(O) is a chart illustrating the waveforms of the detected pulse signals subjected to the FM modulation.
FIG. 4(P) is a chart illustrating the waveform of the demodulated signal.
FIG. 4(Q) is a block diagram showing the FM demodulating circuit.
FIGS. 4(R) to (U) are charts illustrating the waveforms at the respective portions.
FIG. 4(V) is a block diagram showing a phase-modulated signal demodulating circuit.
FIG. 4(W) is a block diagram showing a PCM signal demodulating circuit.
Figure 4J:
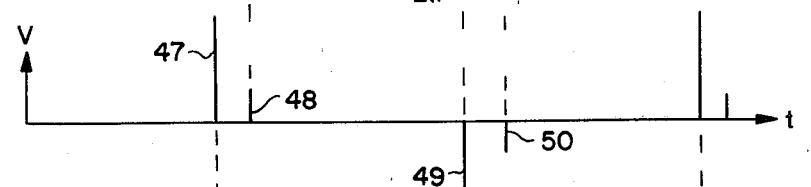
Figure 4K:
Figure 4L:
Figure 4M:
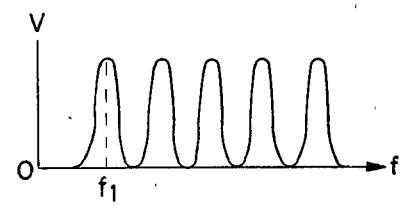
Figure 4N:
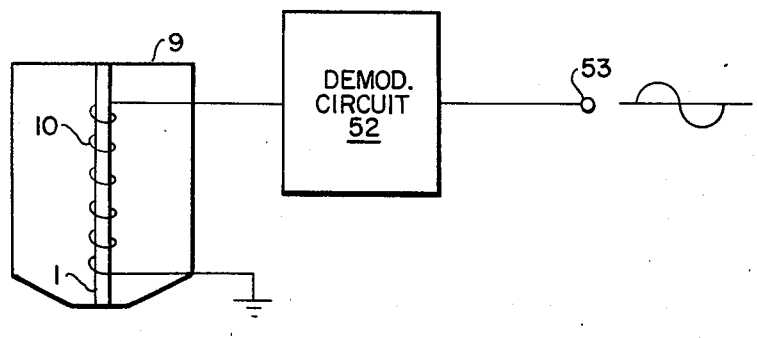
Figure 4O:
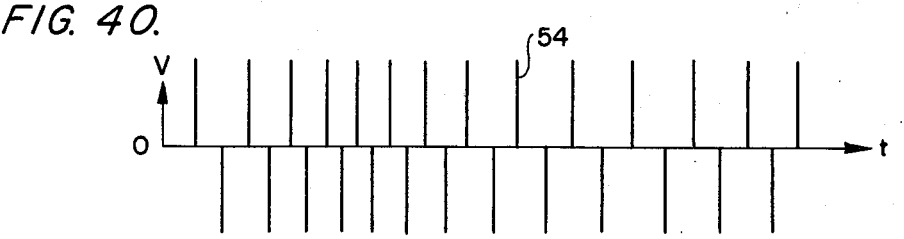
Figure 4P:
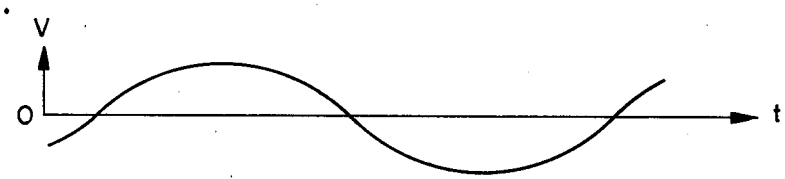
Figure 4Q:
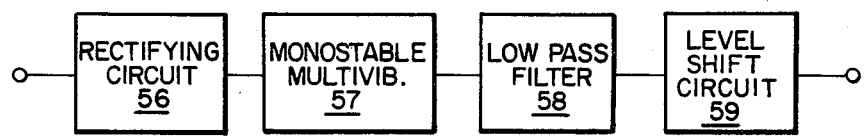

FIG. 4(A) is a transverse section of the magnetic head of the magnetic recording and reproducing system according to the first embodiment; FIG. 4(B) is a side elevation of the front portion of the same; FIG. 4(C) shows an enlarged portion of the contacting portion with a magnetic tape; FIG. 4(D) is a view illustrating the distribution of the perpendicular magnetized signals in the longitudinal direction of the magnetic tape; FIG. 4(E) is a block diagram showing the modulating circuit in the case of the system, in which the output signals of the magnetic head are converted into series digital signals; FIG. 4(F) is a block diagram showing a more concrete circuit construction of the same; FIG. 4(G) is a view showing the transition of the four kinds of magnetized conditions of the magnetic switching device in accordance with the running operation of the magnetic tape; FIG. 4(H) shows the time change of the magnetic field to be impressed upon the magnetic head during the running operation of the tape; FIG. 4(I) shows the time change of the magnetic flux in the magnetic circuit of the magnetic head; FIG. 4(J) shows the voltage waveforms to be induced in the coil; FIG. 4(K) shows the output waveforms of the demodulating circuit of the digital converting system; FIG. 4(L) is a view showing the frequency spectrum of the detected signals; FIG. 4(M) is a view showing the filtering characteristics of a saw filter; FIG. 4(N) is a block diagram showing a frequency modulating system; FIG. 4(O) is a view showing the waveforms of the input signals of the same;

FIG. 4(P) is a waveform view showing the output of the same; FIG. 4(Q) is a block diagram showing a more concrete circuit of a frequency modulating circuit; FIGS. 4(R) to (U) are signal waveform views of the respective portions of the same; FIG. 4(V) is a block diagram of a phase modulating system; and FIG. 4(W) is a block diagram showing a PCM system.

As shown in FIG. 4(A), the first embodiment corresponds to the case, in which the rod-shaped Wiegand effect type magnetic switching device is used as an example of the magnetic switching device 1 to thereby constitute a magnetic head 9 with a view to simplifying the explanation. Numeral 10 indicates a detecting coil, which is wound as a magnetic detector around the magnetic detecting device 1 and which is connected through lead wires 11 and 12 to external output terminals 13 and 14. Numerals 15 and 16 indicate shield cores of highly permeable material, which shield the magnetic switching device 1 from the unnecessary magnetic signals on the magnetic tape and which constitute a closed magnetic path including a gap. Arrows 17 and 18 have their axis of easy magnetization aligned. Numeral 19 indicates a hard element of glass or the like which has substantially the same hardness as those of the shield cores 15 and 16 and the magnetic switching device 1 and which is filled in between. Numeral 20 indicates a spacer for fixing the magnetic switching device 1. Numeral 21 indicates a rear shield core which is disposed at the back of the magnetic head 9 and which is magnetically coupled to the shield cores 15 and 16. Numeral 22 indicates a filler which is filled to fix the magnetic switching device 1. In FIG. 4(B), moreover, numeral 23 indicates an aperture which is formed in front of the magnetic head.

In the enlarged view of FIG. 4(C), numeral 25 indicates a magnetic tape which is operative to run in the direction of arrow 26 and which has its axis of easy magnetization arranged in the perpendicular direction. The magnetic tape 25 has such a two-layered construction as is composed of a magnetic layer 27 and a base film 28 made of a magnetic material having a large BH product. Incidentally, the arrows in the magnetic layer 27 indicate the direction and amplitude of the magnetization by the magnetized signals.

In FIG. 4(D), a sine wave 29 shows the distribution of the perpendicular magnetic field resulting from the magnetized signals of the magnetic layer 27 of the magnetic tape 25 in FIG. 4(C).

In the block diagram of the digital signal demodulating circuit of FIG. 4(E), numerals 1 and 10 indicate the magnetic switching device and the coil in the magnetic head 9, respectively. Moreover, numerals 31, 32, 33 and 34 indicate an amplifier, a separating circuit for separating the output pulses of the magnetic head 9 into positive and negative pulses, a flip-flop circuit, and an output terminal, respectively.

In FIG. 4(F) showing the circuit of the FIG. 4(E) in a more concrete manner, the same components are indicated at the same numerals. Numeral 35 indicates a saw filter. The output, which is filtered and amplified by the saw filter 35 and by the amplifier 31, is divided into two outputs. One these outputs has its level shifted by the separating circuit 32, which is composed of a capacitor 39 and a resistor 40 connected to a positive power source 41, so that it is impressed upon the reset terminal of the flip-flop circuit 33. The other output of the amplifier 31 is inverted by an inverter 42 of the separating circuit 32 and is impressed upon the set terminal of the flip-flop circuit 33.

FIG. 4(G) shows the five magnetized conditions 2a, 2b, 2d, 2h and 2j of the magnetic switching device 1, and the arrows therein indicate the amplitudes and directions of the magnetic field impressed.

In FIG. 4(H), a sine wave 45 illustrates the time change of the magnetic field which is impressed through the aperture 23 of the magnetic head 9 upon the magnetic switching device 1. The points corresponding to the five magnetized conditions of FIG. 4(G) are indicated at 2a, 2b, 2d, 2h and 2j.

A trapezoidal wave 46 in FIG. 4(I) illustrates the time change of the magnetic flux in the magnetic switching device 1.

In FIG. 4(J): numeral 47 indicates a voltage pulse due to the primary jump in the positive direction; numeral 48 indicates a voltage pulse due to the secondary jump in the positive direction; numeral 49 indicates a voltage pulse due to the primary jump in the negative direction; and numeral 50 indicates a voltage pulse due to the "secondary jump" in the negative direction.

In FIG. 4(K), a square wave 51 indicates a series digital signal which is demodulated from the positive and negative pulse voltages 47 and 49 of FIG. 4(J).

The operations will be described in the following. The magnetic head 9 having the construction shown in FIGS. 4(A), (B) and (C) uses the Wiegand effect type magnetic switching device 1 as the magnetic switching element. The magnetic shielding is supplied by the shield cores 15, 16 and 21, and a closed magnetic path including a gap is constructed. Since the magnetic reluctance between the magnetized signals on the magnetic tape 25 and the non-contact end of the magnetic switching device 1 is lowered by those shield cores 15, 16 and 21, more magnetic flux passes through the magnetic switching device 1 so that high sensitivity can be attained. At the same time, the influences of signals other than the magnetized signals to be detected are shielded.

Since the magnetized signals of the magnetic tape 25 are distributed in the form of the distribution curve 29 of FIG. 4(D), the magnetic field entering the aperture 23 of the magnetic head 9 in accordance with the running operation of the tape is changed with the time, as shown at 2a, 2b to 2l, along the curve 45 in FIG. 4(H). This effects the magnetization with respect to the time lapse, as shown at 1a, 1b to 1l, along the magnetization hysteresis curve 7 of FIG. 2, which has been described in connection with the principles of the Wiegand effect type magnetic switching device. As a result, when the magnetic field is increased from the point 2a to the point 2b of FIG. 4(H), the "primary jump" phenomena takes place, and the magnetization of the lower magnetic coercive portion 3, changes which is retained by the higher magnetic coercive portion 2, so that the magnetized condition is changed from the point 2a to the point 2b of FIG. 4(G). As a result, the quantity of the magnetic flux is instantly changed from the point 2b to the point 2d of FIG. 4(I). The changing rate of the magnetic flux with respect to time at this time is remarkably high. Thus, the primary switching pulses having a high turn-over value, as shown at 47 in FIG. 4(J), and are generated as the induced voltage in the coil 10 which is wound around the magnetic switching device 1.

When the magnetic field is so intensified that the point 2d of FIG. 4(H) is reached, the magnetic inversion of the higher magnetic holding portion 2, i.e., the aforementioned "secondary jump" takes place so that the magnetized condition is shifted from the point 2b to the point 2d of FIG. 4(G). At this time, the quantity of the magnetic flux jumps slightly from the point 2d to the point 2e of FIG. 4(I) so that a small pulse voltage is generated in the coil 10, as shown at 48 of FIG. 4(J). After that, as shown in FIG. 4(H), the magnetic field is weakened on and on after the point 2f until it is inverted at the point 2g. Since the lower magnetic holding layer 3 is retained by the higher magnetic holding layer 2, no magnetic inversion takes place. Moreover, when the intensity of the opposite magnetic field reaches the point 2h of FIG. 4(H), the similar "primary jump" to that at the point 2b is established to the point 2i. Since, in this instance, the direction for the magnetic flux to increase is opposite to that in the case of the point 2b, the pulse voltage to be induced in the coil 10 also becomes opposite, as shown at 49 in FIG. 4(J). As the opposite magnetic field is intensified, the "secondary jump" phenomena take place at the point 2j so that such a low pulse voltage as is shown at 50 in FIG. 4(J) is generated.

After that, the opposite magnetic field is reduced, and the external magnetic field restores its initial condition so that the magnetized condition of the magnetic switching device 1 is returned to the point 2a.

Thus, as the magnetic tape runs 25, the pulse output shown in FIG. 4(J) appears at the output terminals 13 and 14 of the magnetic head. The circuit of FIGS. 4(E) and (F) is one example for demodulating the pulse output to the original signals, i.e., a circuit for demodulating the pulse output to the series digital circuits shown in the form of the square wave 51 of FIG. 4(K). In the fundamental block diagram of FIG. 4(E), the output from the magnetic head 9 is amplified by the amplifier 31 and then is separated into positive and negative pulses, which are impressed upon the set terminal and the reset terminal of the flip-flop circuit 33. As a result, the series digital signals shown in FIG. 4(K) are demodulated at the terminal 34. In this instance, even if the low pulse voltage of the same polarity is generated as the output due to the "secondary jump" by the separating circuit 32, the signals are not impressed upon the same terminal of the flip-flop circuit 33 so that this circuit 33 is not switched.

Incidentally, in case the sensitivity of the separating circuit 32 is high, the amplifier 31 can be dispensed with.

In the concrete circuit of FIG. 4(F), there is added the saw filter 35 which is provided to eliminate the noises other than the pulses to be detected. The switching time of the magnetic inversions of the magnetic switching device 1 is determined by the time period for which the movement of the magnetic wall is propagated from end to end. The moving speed of the magnetic wall is determined by the material used, and the propagation distance is determined by the geometric shape of the magnetic switching device. Therefore, the magnetic switching time can be deemed constant among the respective magnetic switching devices. The spectrum distributions of the respective detected signals become those having high frequency waves $f_2$ to $f_n$ for the fundamental switching frequency $f_1$, as shown in FIG. 4(L). By the use of the saw filter having the filtering characteristics of FIG. 4(M), the pulses can be separated from the other noise signals so that the sensitivity can be substantially enhanced.

As has been apparent from the foregoing description, by the use of the magnetic head 9, the pulse output is attained in accordance with the magnetic inversion of the perpendicular magnetized signals so that little fluctuations in the output voltage take place even with the fluctuations in the running speed of the magnetic tape. On the other hand, the demodulation can be effected to recreate the original signals by the use of the simple demodulating circuit.

As shown in FIG. 4(N), moreover, by using a demodulating circuit 52 of the frequency-modulated signals as the demodulating circuit, the pulse output signals from the magnetic head 9 can also be demodulated into the original signals such as analog signals.

The operations will be described in the following. For the magnetic signals which are recorded in the magnetic recording medium with the frequency being modulated, pulse signals 54 shown in FIG. 4(O) are generated as the output of the magnetic head 9 when in the reproducing operation. The period of the pulse signals 54 is modulated by the amplitude of the original signals. Namely, the modulated information is contained in the time axis. As a result, analog signals 55 shown in FIG. 4(P) are reproduced by the demodulating circuit 52 of the FM signals.

The concrete block diagram is shown in FIG. 4(Q).

Figure 4R:
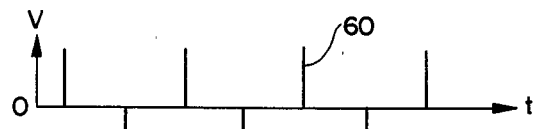
Figure 4S:
Figure 4T:
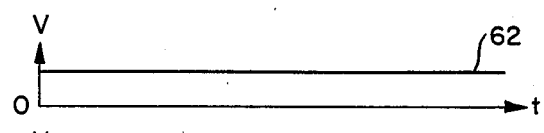
Figure 4U:
Figure 4V:
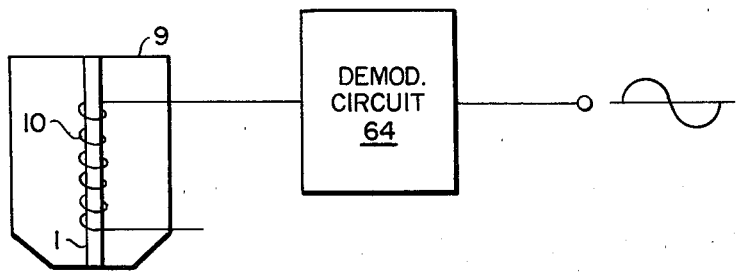
Figure 4W:
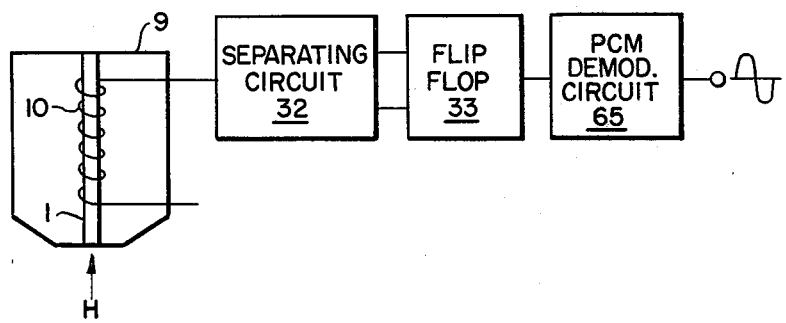

First of all, detected signals 60 as shown in FIG. 4(R) are changed, after having passed through a full-wave rectifying circuit 56, into a square wave 61 shown in FIG. 4(S) by the action of a monostable multivibrator 57. The square wave 61 thus generated is demodulated by a low-pass filter 58 into the original signals 62 of the analog signals, as shown in FIG. 4(T), so that its zero volt level is compared and calibrated by a level shift circuit 59 with a reference voltage for demodulating the zero volt, thus demodulating the complete original signals. FIG. 4(U) shows the condition, under which the original signals at zero volt are demodulated.

In FIG. 4(U), if the frequency of the detected signals 60 is raised, the potential of a demodulated output 63 is also raised. And, if the frequency is decreased, the potential of the demodulated output 63 is lowered.

FIG. 4(V) shows the construction of the system for demodulating the detected signals from the magnetic signals, which have been phase-modulated and recorded, into the original signals by the use of a demodulating circuit 64 of the phase-modulated signals.

FIG. 4(W) shows the construction of the system for adding a PCM demodulating circuit 65 to the demodulating circuit of the digital signals, which is shown in FIG. 4(E), for the demodulating purpose. These operations are apparent from the foregoing description.

If, in case the external interference magnetic field is added to the time change of the magnetic field shown in FIG. 4(H), the center portion of the magnetic switching device 1 reaches the threshold value of a certain magnetic field so that it is once inverted to generate pulses, no voltage pulse is generated as far as the magnetic field in the opposite direction is applied. More specifically, since the magnetic switching device 1 has the hysterisis characteristics for the magnetic field, it becomes unnecessary to effect the electric treatment with the use of the hysterisis of the conventional Schmidt trigger circuit. Thus, the circuit for demodulating the signals can be simplified more than the convention system. Incidentally, the secondary jump may not be effected in dependence upon the BH characteristics of the magnetic switching device. In this instance, however, the secondary jump does not contribute to the reproduction of the output so that the same operations as those in the above are performed.

[EMBODIMENT 2]

Figure 5A:
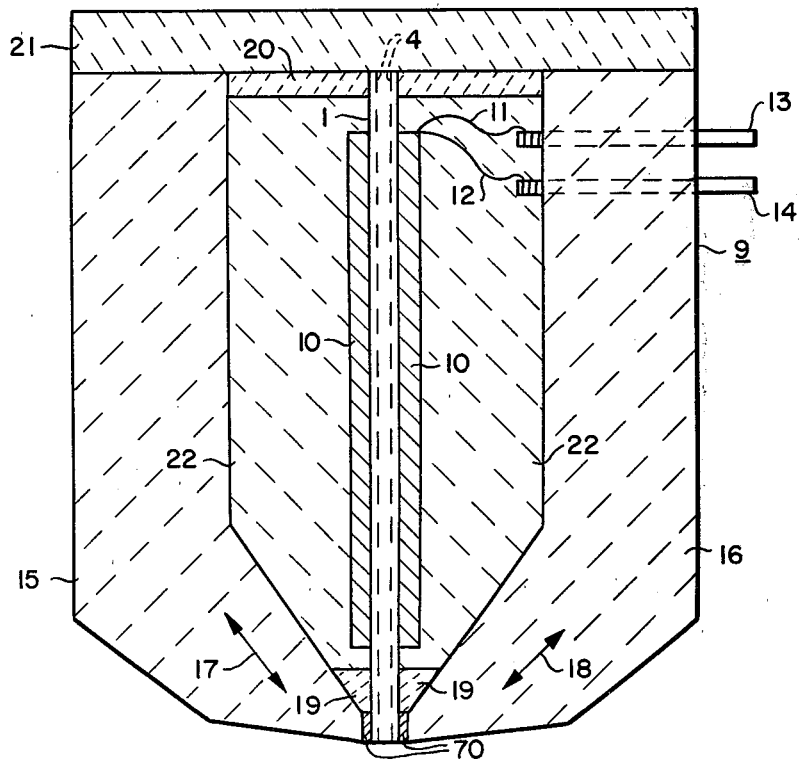
FIG. 5(A) is a sectional view showing a second embodiment of the present invention.
Figure 5B:
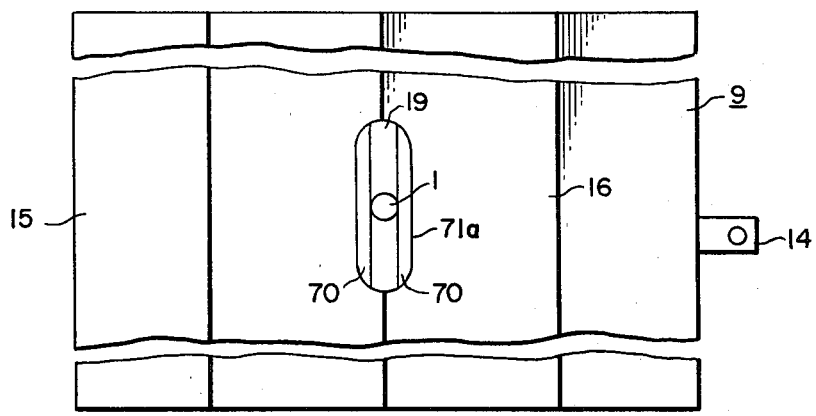
FIG. 5(B) is a side elevation showing the front portion of the same.
Figure 5C:
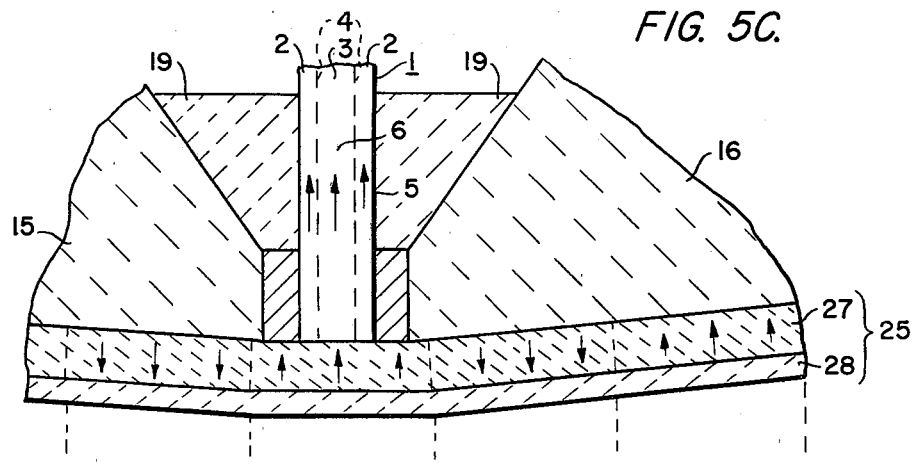
FIG. 5(C) is a sectional view showing an essential portion of the same in an enlarged scale for illustrating the relationship with a magnetic recording medium.
Figure 5D:
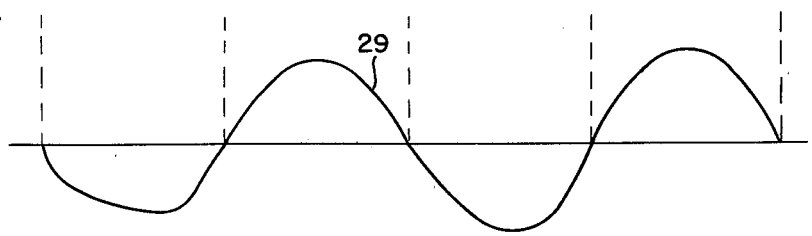
FIG. 5(D) is a chart illustrating the magnetization distribution on the perpendicular magnetic recording medium.
Figure 5E:
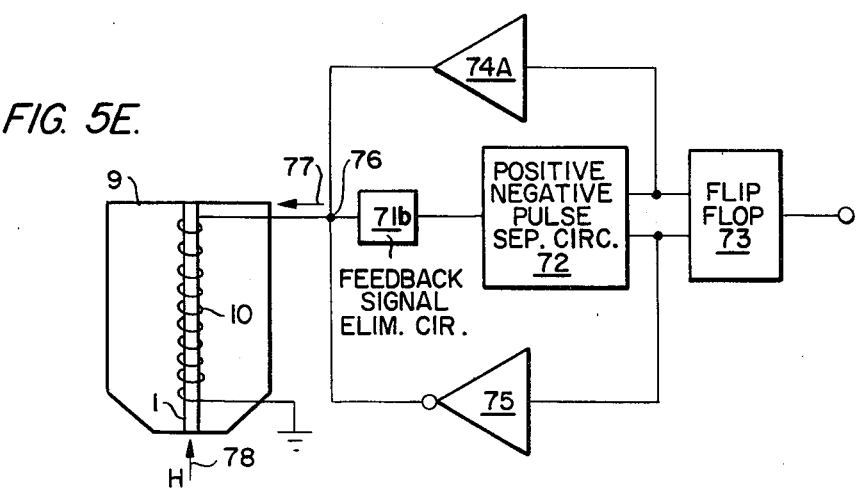
FIG. 5(E) is a block diagram showing the construction of a demodulating circuit using the second embodiment.
Figure 5F:
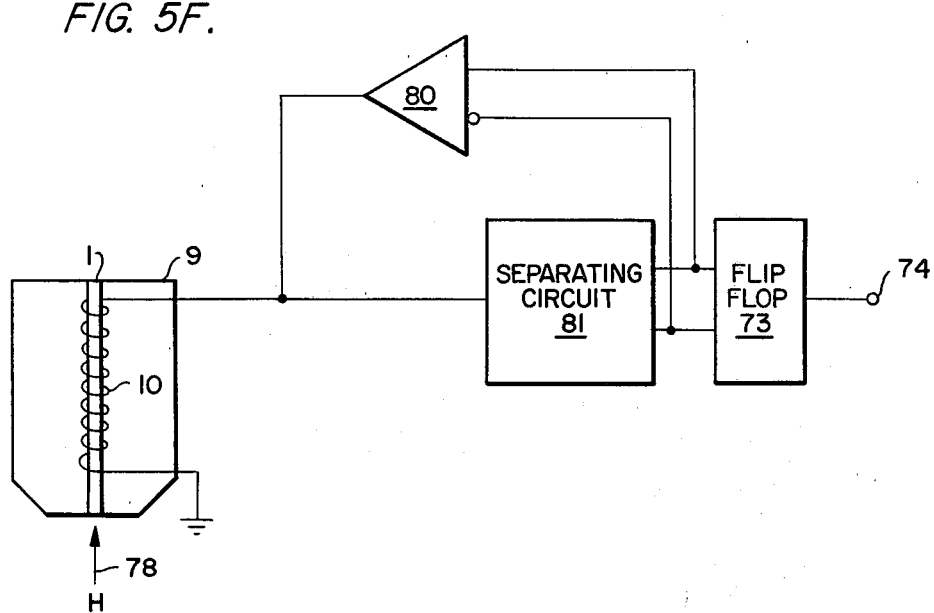
FIG. 5(F) is a block diagram showing a partial modification of the circuit construction.
Figure 5G:
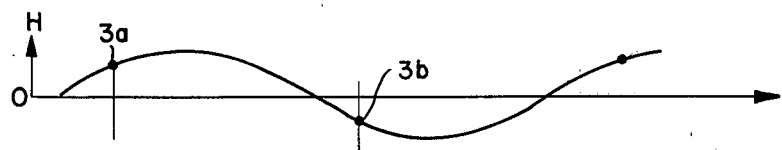
FIGS. 5(G) to (M) are charts illustrating the waveforms of the respective portions of the construction of FIG. 5(E).

FIGS. 5(A) and (B) are respectively a transverse sectional view and a side elevation of the magnetic head of the magnetic recording and reproducing system according to the second embodiment; FIG. 5(C) is an enlarged view showing the aperture of the magnetic head. FIG. 5(D) is a view showing the magnetization distribution of the signals on the magnetic tape; FIG. 5(E) is a diagram showing the demodulating circuit of the series digital signals; FIG. 5(F) is a diagram showing another demodulating circuit; and FIG. 5(G) is a view showing the waveforms of the respective portions.

The magnetic head 9 shown in FIGS. 5(A), (B) and (C) is made to have fundamentally the same construction as that of the magnetic head of the first embodiment excepting that a spacer 70 having an excellent conductivity of Be-Cu is sandwiched between the magnetic shield cores 15 and 16 and the magnetic switching device 1. Since a high eddy current is generated in the spacer 70 for the time change in the magnetic field through the spacer 70, a high magnetic resistance is attained for the magnetic field having a changing rate with respect to time.

Since the magnetized signals on the magnetic tape have their magnetic flux absorbed in the adjacent magnetized signals having the opposite polarity, the magnetic flux entering the aperture 71a of the magnetic head 9 is reduced. In accordance with the running operation of the magnetic tape 25, the magnetic field entering the aperture 71a has the changing rate to time. By the provision of the spacer 70, the influences from the adjacent magnetized signals are eliminated, and the high magnetic resistance of the spacer 70 against the changed magnetic field is utilized to introduce the magnetic flux into the magnetic switching device 1, with the resultant increase in sensitivity.

In the demodulating circuit of FIG. 5(E), the output of the magnetic head 9 is fed through the magnetized feedback signal eliminating circuit 71b to a positive and negative pulse separating circuit 72 so that it is divided into the set signals and the reset signals. Since a flip-flop circuit 73 is set or reset in response to those signals, series digital signals are generated at an output terminal 74. Independently of this, the set and reset signals from the separating circuit 72 drive a positive magnetizing signal generator 74A and a negative magnetizing signal generator 75 so that the positive and negative magnetizing signals are generated at a head terminal 76. Since, in response to those signals, the current in the positive direction indicated at arrow 77 or in the opposite or negative direction flows through the coil 10 which is wound on the magnetic switching device 1, the magnetic field in the positive direction indicated at arrow 78 or in the opposite or negative direction is generated so that the core 3 and the shell 2 of the magnetic switching device 1 are magnetized together in the same direction. Since those positive and negative magnetizing signals are filtered out by a filter circuit 71b, they can be prevented from driving again the positive and negative magnetizing signal generators through the separating circuit 72 and accordingly from effecting the oscillations.

The foregoing operations will now be described with reference to the waveform views of FIGS. 5(G) to (M).

Figure 5H:
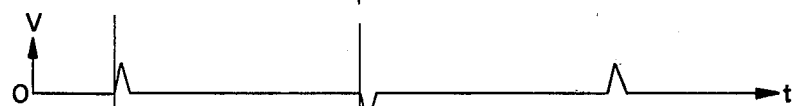
Figure 5I:
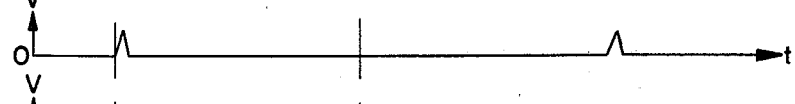
Figure 5J:
Figure 5K:
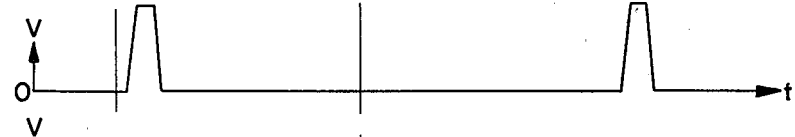
Figure 5L:
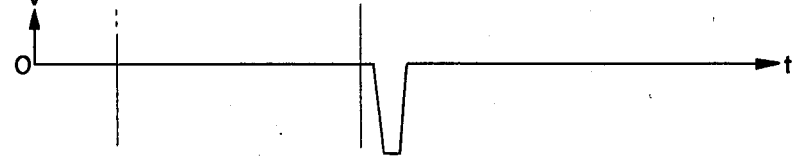
Figure 5M:

Among these, FIG. 5(G) shows the time change of the magnetic field to be applied to the magnetic switching device 1; FIG. 5(H) shows the waveform of the pulse output voltage of the coil 10; FIGS. 5(I) and (J) show the waveforms of the set and reset outputs of the separating circuit 72, respectively; FIGS. 5(K) and (L) show the output waveforms of the positive magnetizing pulse generator 74a and the negative magnetizing pulse generator 75, respectively; and FIG. 5(M) shows the signal waveforms of the terminal 76. The signals at terminal 76 have a waveform in which the magnetizing pulse voltage and the pulse signals of the magnetic switching device 1 are superposed.

When the magnetic field impressed is increased so that the point 3a of FIG. 5(G) is reached, the positive pulse voltage shown in FIG. 5(H) is generated by the "primary jump" phenomena in a similar manner to the first embodiment. The positive pulse voltage is separated by the separating circuit 72 into the set signals shown in FIG. 5(I) to set the flip-flop circuit 73 so that digital signals are demodulated at the output terminal 74 and to drive the positive magnetizing signal generator 74 so that the positive magnetizing signals shown in FIG. 5(K) are generated. In response to these magnetizing signals, a current flows through the coil 10 to shift the condition, under which the core 3 and the shell 2 of the magnetic switching device 1 are magnetized in the positive and negative directions, respectively, to the condition, under whick the core 3 and the shell 2 are magnetized together in the same positive direction by the sufficient magnetization in the positive direction. The positively magnetized signals can be easily filtered out by the filter circuit 71 of either the system, in which discrimination is performed by making use of the fact that the signals are different in the electromagnetic value and in the frequency band from the detected pulses of the magnetic switching device 1, or the system, in which the input of the separating circuit 72 is blocked for a preset time period in response to the set and reset signals. As a result, no oscillation takes place in the closed loop. Then, if the point 3b of FIG. 5(G) is reached after the magnetic field impressed is so reduced that it is inverted into the negative direction, only the core 3 is inverted into the negative direction by the aforementioned "primary jump" phenomena in the negative direction, and the negative pulses shown in FIG. 5(H) are generated in the detecting coil 10 so that the reset signals shown in FIG. 5(J) are generated by the separating circuit 72. As a result, the output signals of the output terminal 74 are changed from "1" to "0" so that both the core 3 and the shell 2 are magnetized in the same negative direction by the pulses shown in FIG. 5(L) and coming from the negative magnetizing signal generator 75.

In this second embodiment, as has been described hereinbefore, since the magnetized direction of the shell 3 having a higher magnetic holding force is inverted by the outputs of the magnetizing circuits 74 and 75, the magnetic field, which is generated by the magnetized signals of the magnetic recording medium 25, can suffice the purpose if its level is so high as to invert only the core 3 having a lower magnetic coercive force. As a result, in addition to the case of the first embodiment, it is possible to attain an advantage that the recorded signals of high density can be reproduced. Since, moreover, the magnetizing direction is the same as that of the recorded signals, these signals can be prevented from being demagnetized.

Incidentally, the demodulating circuit may be constructed, as shown in FIG. 5(F), to include a positive and negative magnetizing signal generator 80 and a separating circuit 81 for discriminating and separating the signals from the coil 10 to generate the reset and set signals of the flip-flop circuit 73 on the basis of the output pulses from the coil 10.

Figure 6A:
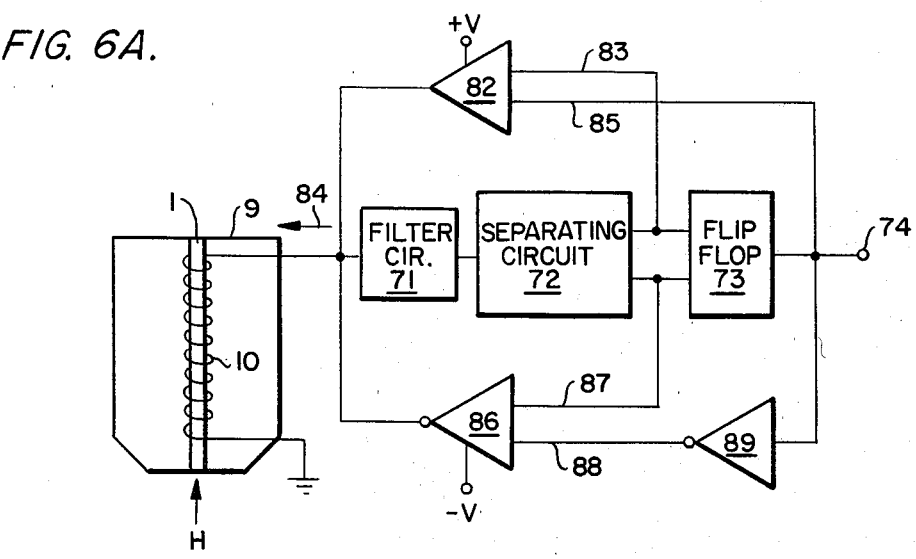
FIG. 6(A) is a block diagram showing the construction of the demodulating circuit using the second embodiment.
Figure 6B:
FIGS. 6(B) to (K) are charts illustrating the waveforms at the respective portion of the same.
Figure 6C:
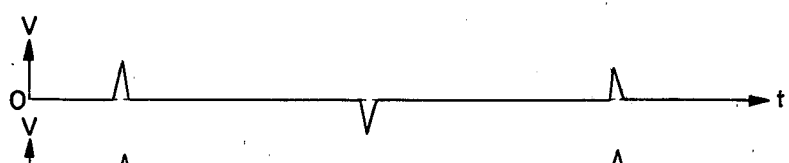
Figure 6D:
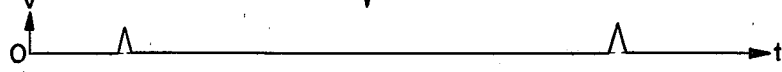
Figure 6E:
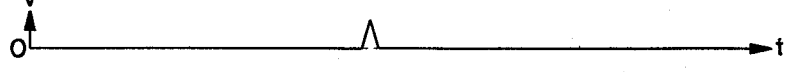
Figure 6F:
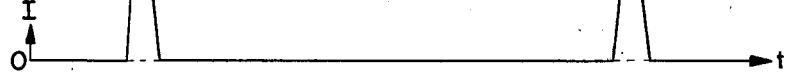
Figure 6G:
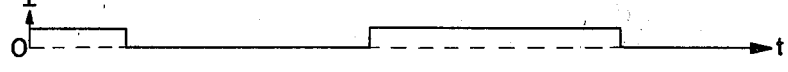
Figure 6H:
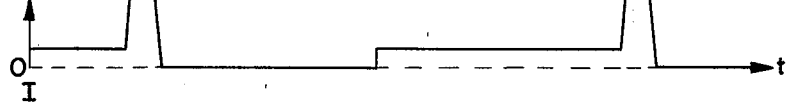
Figure 6I:
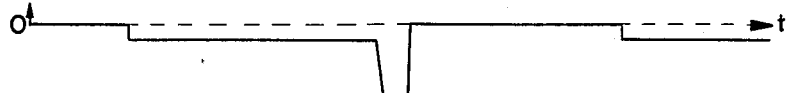
Figure 6J:
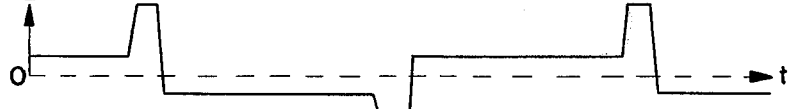
Figure 6K:
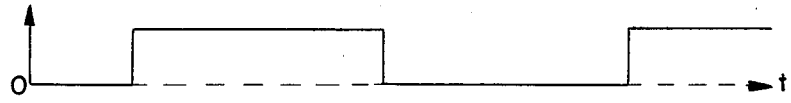
Figure 6L:
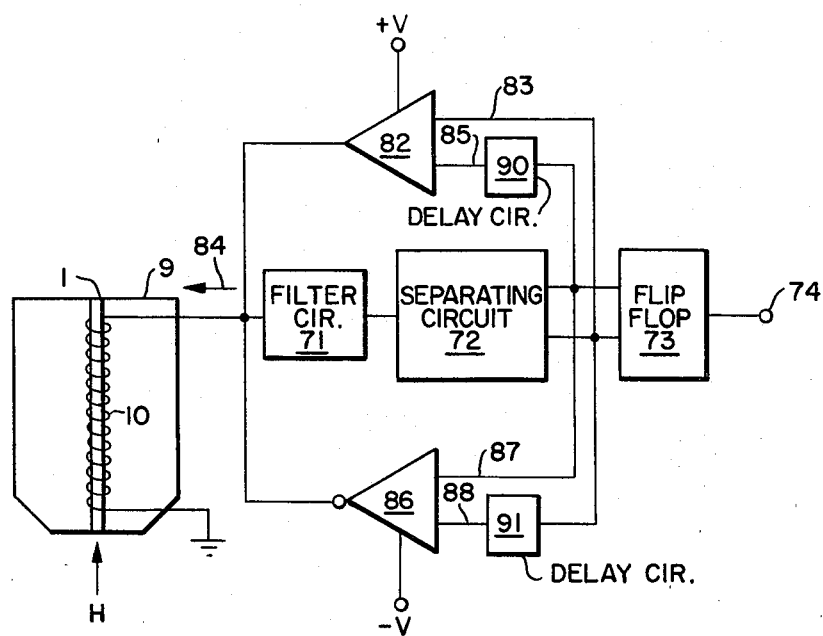
FIG. 6(L) is a block diagram showing a drive detecting circuit when in an asymmetrical drive.
Figure 6M:
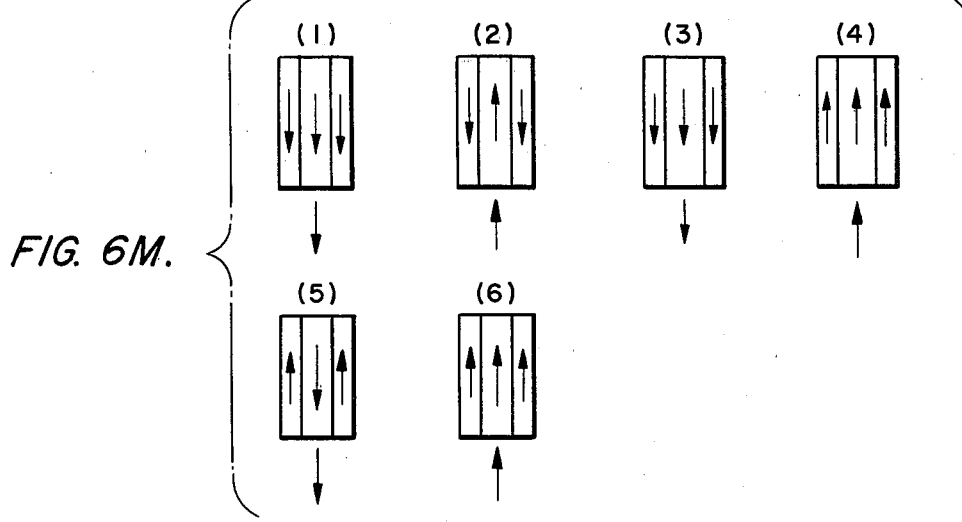
FIG. 6(M) are views illustrating the magnetized conditions of a magnetic switching device.

FIG. 6(A) is a block diagram showing another drive detecting circuit of the magnetic head of the embodiment thus far described; FIGS. 6(B) to (K) are views showing the waveforms at the respective portions; FIG. 6(L) shows still another drive detecting circuit; FIG. 6(M) shows six kinds of magnetized conditions of the magnetic switching device; and FIGS. 6(N) to (W) show the waveforms at the respective portions.

The drive detecting circuit to be used is similar to that of FIGS. 5(E) and (F) with a slight difference. The operations will be described in the following. The magnetized signals on the magnetic recording medium are varied with the time, as shown in FIG. 6(B). As a result, the output of the detecting coil 10, which is wound around the magnetic switching device 1 of the magnetic head 9, is shown in FIG. 6(C) in a similar manner to FIGS. 5(E) and (F). After the magnetized feedback signals are filtered out by the filter circuit 71, the output pulses from the detecting coil 10 shown in FIG. 6(C) are separated by the separating circuit 72 into the set signals of FIG. 6(B) and into the reset signals of FIG. 6(E) thereby to operate the flip-flop circuit 73. As a result, the series digital signals of FIG. 7(K) are demodulated at the output terminal 74. The set signals are simultaneously impressed upon the high gain terminal 83 of a positive magnetizing signal current amplifier 82. If the direction of arrow 84 is assumed to be that of the positive feedback current to the detecting coil, the positive magnetizing current of high amplitude, shown in FIG. 6(F), is fed as an output current to the detecting coil 10. Since, on the other hand, a low gain terminal 85 is supplied with the output signals of the flip-flop circuit 73 shown in FIG. 6(K), the magnetizing current of small amplitude, which is operative to generate such a magnetic field that will not invert the low magnetic coercive portion of the magnetic switching device 1 shown in FIG. 6(G), flows as the bias current. As a result, the posivie magnetizing current to be supplied to the coil 10 is composed by the positive magnetizing signal current amplifier 82, as shown in FIG. 6(H). On the other hand, a negative magnetizing current amplifier 86 has its high gain terminal 87 supplied with the reset signals shown in FIG. 6(E) and its low gain terminal 88 supplied with the signals which are inverted by an inverter 89 from the demodulated digital signals shown in FIG. 5(K). Likewise, the negative magnetizing current having the waveform shown in FIG. 6(I) is fed to the detecting coil 10. Since the detecting coil 10 is supplied with the positive magnetizing current of FIG. 6(H) and with the negative magnetizing current of FIG. 6(I), it is supplied with the current having the waveform shown in FIG. 6(J) so that the magnetic switching device 1 is forcibly magnetized.

As has been described hereinbefore, the operation that the magnetic inversion of the higher magnetic coercive portion of the magnetic switching device 1 is forcibly driven in response to the magnetizing signals from the outside to thereby enhance the sensitivity. In the second embodiment, it is necessary to generate such a magnetic field in response to the recorded magnetized signals that can effect the magnetization to the level of the magnetic coercive force of the lower coercive portion. Since, in this embodiment, such a weak bias magnetic field that will not magnetically invert the low coercive portion is fed in advance in the same direction of the magnetizing signals to be detected next, the magnetic inversion of the magnetic switching device 1 is established even for the weak magnetizing signals with the resultant effect that the sensitivity is substantially enhanced. This means that the bias magnetic field to be applied has a level shown between the points $1a$ to $1b$ or between the points $1g$ to $1h$ of the curve of FIG. 2.

If, incidentally, a back plate made of a highly permeable material is disposed against the aperture 23 of the magnetic head 9 while clamping the magnetic tape 25 in between, the magnetic flux, which might otherwise leak to the coercive portion 28 of the magnetic tape 25, can be fed through the cores 15 and 16 to the end terminal of the magnetic switching device 1, thus enhancing the sensitivity. In this instance, the coercive force of the magnetic switching device experiences temperature changes. By the temperature changes of the threshold value for the magnetic inversion of the bias magentic field with a view to enhancing the sensitivity, the magnetic inversion is effected so that a malfunction may result. In order to obviate this malfunction, a temperature detecting element is provided in the lower thermal resistance portion for the magnetic switching device in the magnetic head, and the bias magnetic field is controlled by means of a circuit in accordance with the temperature so that the bias magnetic field can approach the threshold value of magnetic inversion, with the resultant rise in the sensitivity.

Although, in the embodiments, the foregoing description is directed to the case in which the magnetic switching device 1 is forcibly magnetized in the same direction as the detected signals, there can be employed a drive system, in which an asymmetric drive is performed to effect the forced magnetization in the opposite direction to the detected magnetized signals.

In this instance, the connecting method the circuit is changed in the manner shown in FIG. 6(L), and delay circuits 90 and 91 may be added.

FIG. 6(M) is a view showing the magnetized conditions of the magnetic switching device; and FIGS. 6(N) to (W) show the waveforms at the respective portions.

The operations of the magnetizing system of the opposite direction will be described in the following. In accordance with the running operation of the magnetic recording medium, the time change in the magnetic field, which is generated in the magnetic circuit of the magnetic head, follows the shape shown in FIG. 6(N). By the magnetic inversion of the magnetic switching device 1, the pulse voltage shown in FIG. 6(O) is generated.

For the detected pulses generated for the first time in the positive direction, the set voltage generated out of the set output terminal of the separating circuit 72 as shown in FIG. 6(P) is applied to the high gain terminal 87 of the negative magnetizing signal current amplifier 86, and the negative magnetizing current shown in FIG. 6(R) flows through the detecting coil 10 so that the magnetic switching device 1 is magnetized in the negative direction, as shown at (1) in FIG. 6(M).

Since the set voltage is applied to the low gain terminal 85 of the positive magnetizing current amplifier 82 after it has simultaneously passed through the delay circuit 90, the positive magnetizing current of small amplitude, as shown in FIG. 6(S), will flow through the detecting coil 10. As a result, the magnetic switching device 1 has only its low magnetic coercive portion inverted from the condition (1) of FIG. 6(M) to the condition (2) of the same. Thus, the magnetizing current generated by the set voltage composes the waveforms of FIGS. 6(R) and (S) thereby to have a waveform shown in FIG. 6(T).

In case the detecting point of the magnetic head 9 is then supplied with the magnetizing signals in the negative direction, the magnetized condition of the magnetic switching device 1 is changed from (2) to (3) in FIG. 6(M). In short, by the magnetic field of the magnetic recorded signals, only the low magnetic coercive portion is inverted so that the low and high coercive portions are magnetized in the same direction. At this time, as shown in FIG. 6(O), the pulse voltage in the negative direction is generated in the detecting coil 10 so that the reset signals shown in FIG. 6(Q) are generated at the reset terminal of the separating circuit 72 and fed to the high gain terminal 83 of the positive magnetizing current amplifier 82 and to the delay circuit 91 which is connected with the low gain terminal 88 of the negative magnetizing current amplifier 86. Likewise, the magnetizing current shown in FIG. 6(U) slows through the detecting coil 10 so that the magnetic switching device 1 is completely magnetized in the positive direction, as shown at (4) in FIG. 6(M). After that, the device 1 has only its low coercive portion inverted into the negative direction, as shown at (5) FIG. 6(M). In case, under this condition, the positive recorded and magnetized signals reach the detecting point, only the low coercive portion is inverted into the positive direction, as shown at (6) in FIG. 6(M), so that the positive pulse voltage is generated at the detecting coil 10.

By repeating the operating cycles thus far described, the magnetized signals on the magnetic recording medium can be continuously detected.

FIG. 6(V) shows the waveform which is composed from those in FIGS. 6(T) and (U) while showing the magnetizing current to be fed to the detecting coil 1 at the final stage; and FIG. 6(W) shows the modulated signals.

While the magnetizing current is flowing, the pulse voltage is generated in the detecting coil 1 but is filtered out by the filter circuit 71 so that it is not shown in the drawing. If the asymmetric drive system of the positive and negative directions is adopted, a higher output voltage can be generated.

[EMBODIMENT 3]

Figure 7A:
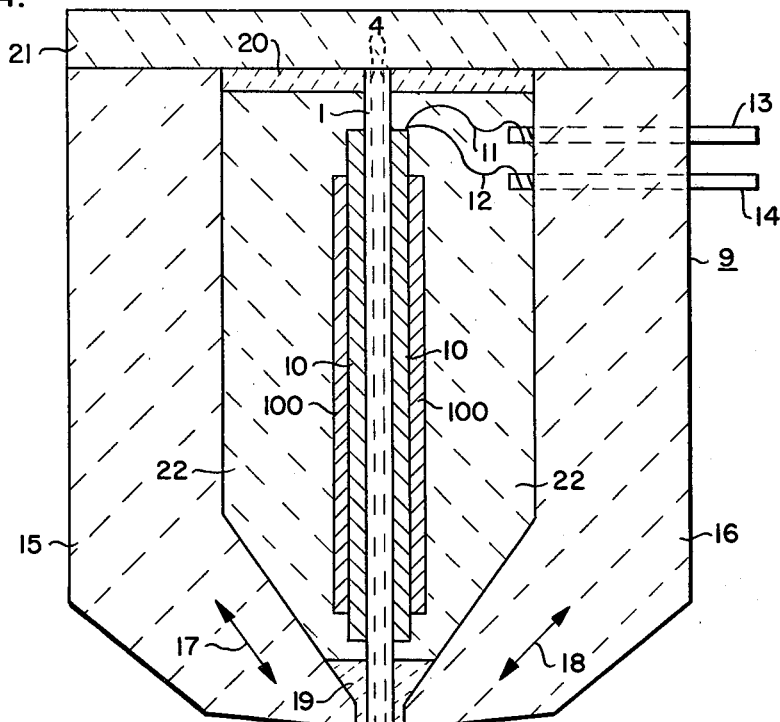
FIG. 7(A) is a sectional view showing a third embodiment of the present invention.
Figure 7B:
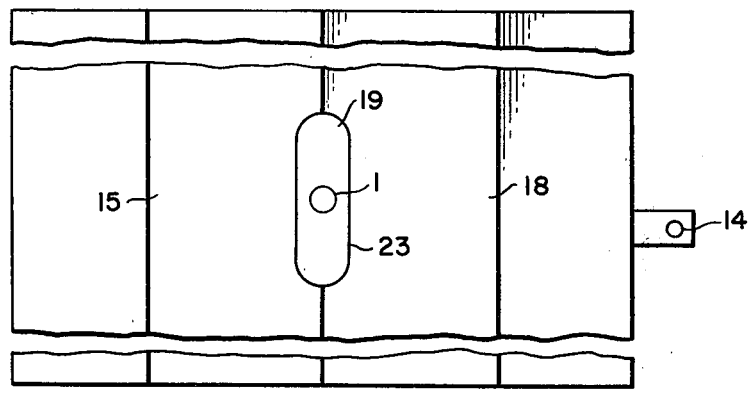
FIG. 7(B) is a front elevation of the same.
Figure 7C:
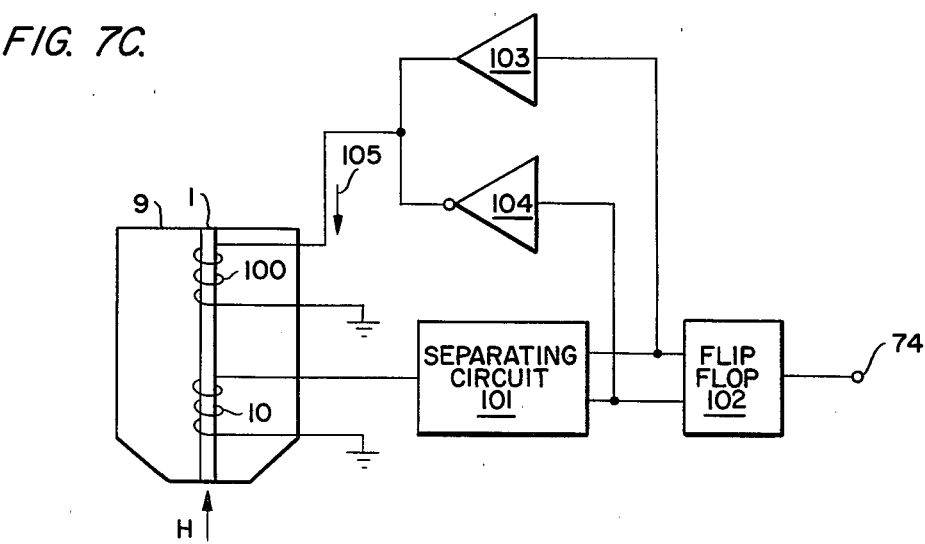
FIG. 7(C) is a block diagram showing the construction of the demodulating circuit using the third embodiment.
Figure 7D:
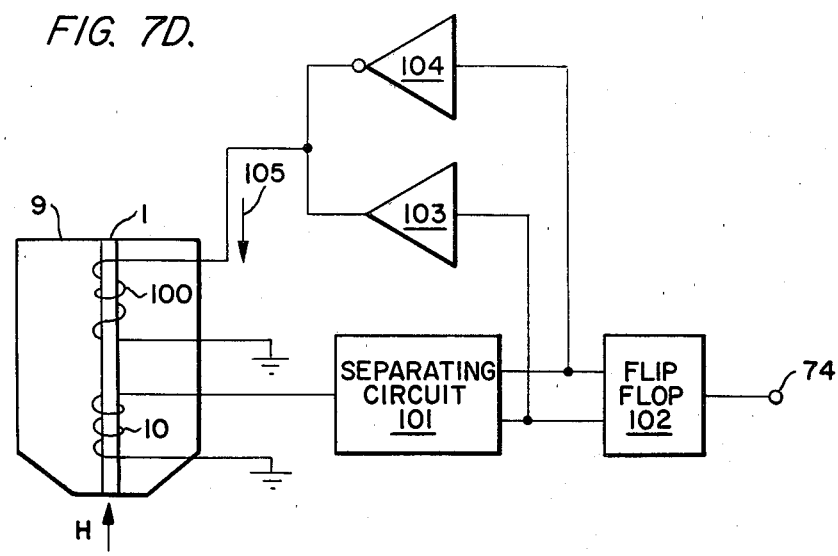
FIG. 7(D) is a block diagram showing a drive circuit in case the drive coil is wound in the opposite direction.

FIGS. 7(A) and (B) are respectively a sectional view and a side elevation of the magnetic head of the magnetic recording and reproducing system according to this third embodiment. FIG. 7(C) is a block diagram showing the demodulating circuit using the same; and FIG. 7(D) is a block diagram showing the demodulating circuit in case the drive coil is wound in the opposite direction.

The magnetic head of this embodiment is different from that of the first embodiment in that a drive coil 100 is additionally wound around the magnetic switching device 1, but all other constructional components are absolutely the same.

In the demodulating circuit shown in FIG. 7(C), the circuit which is connected with the detecting coil 10 of the magnetic head 9 in a separating circuit 101 which is operative to discriminate only the detected signals by the coil 10 and to separate the same into the reset signals and the set signals. The separating circuit 101 has its output terminal connected with the set and reset terminals of a flip-flop circuit 102 and with the input terminals of a positively magnetizing signal generator 103 and a negatively magnetizing signal generator 104. An arrow 105 indicates the direction of the magnetizing current. The difference of this embodiment resides only in the separate provision of the drive coil, but the operating waveforms are absolutely the same as those of the second embodiment, as shown in FIGS. 6(B) to (K), so that the current having the waveforms shown in FIG. 6(J) will flows through the drive coil 100. The magnetizing direction is such that the arrow 105 corresponds to that 84 of FIG. 6(A).

In this third embodiment, since the drive coil 100 and the detecting coil 10 are made separate, the intput impedance of the detecting coil can be optimized with the resultant effect that the sensitivity is enhanced.

In case, incidentally, the winding direction of the drive coil 100 is made opposite to coil 10, as shown in FIG. 7(D), the magnetizing current naturally becomes opposite so that the positional relationships between the positive magnetizing signal generator 103 and the negative magnetizing signal generator 104 are inverted. Thus, for the detected signals, the drive circuit will generate the magnetizing current of the opposite polarity.

[EMBODIMENT 4]

Figure 8A:
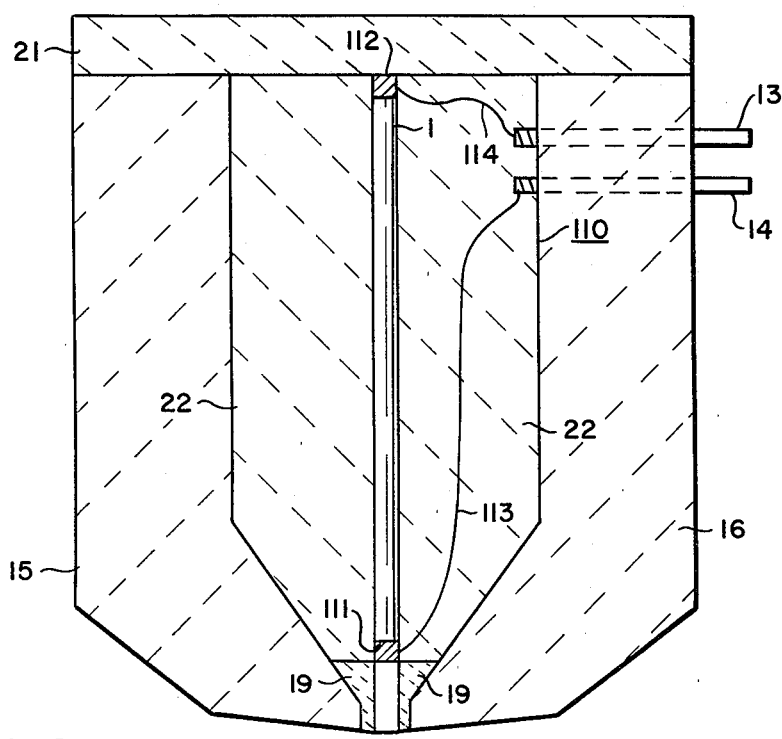
FIG. 8(A) is a sectional view showing a fourth embodiment of the present invention.
Figure 8B:
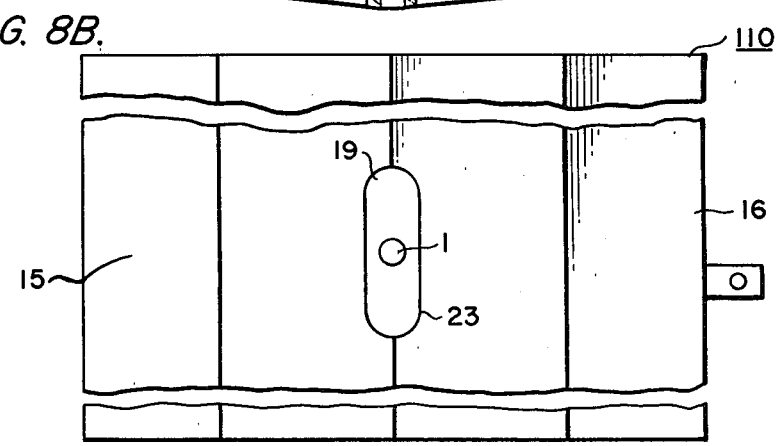
FIG. 8(B) is a side elevation showing the front portion of the same.

FIGS. 8(A) and (B) are respectively a sectional view and a side elevation showing the magnetic head of the magnetic recording and reproducing system according to the fourth embodiment, respectively.

Among the constructional components of a magnetic head 110, as shown, the same constructional components as those in the first embodiment are indicated at the same numerals. The difference from the forgoing embodiments resides in that two electrodes 111 and 112 are connected with the both terminals of the Wiegand effect type magnetic switching device 1 and that two lead wires 113 and 114 are lead out of the external terminals 13 and 14.

This makes use of the fact that a potential difference is established between the both terminals in case the magnetic switching is established at the Wiegand wire.

This phenomena is called the Wiedemann effect after the name of the discoverer. In the Weigand Wire type magnetic switching device, it has been confirmed that a higher output voltage can be generated if it is extracted at the electrodes than if the detecting coil is wound with its number of turns less than a preset number.

By using the Wiedemann effect to extract the generated voltage, the construction of the magnetic head can be simplified and reduced in size.

[EMBODIMENT 5]

Figure 9A:
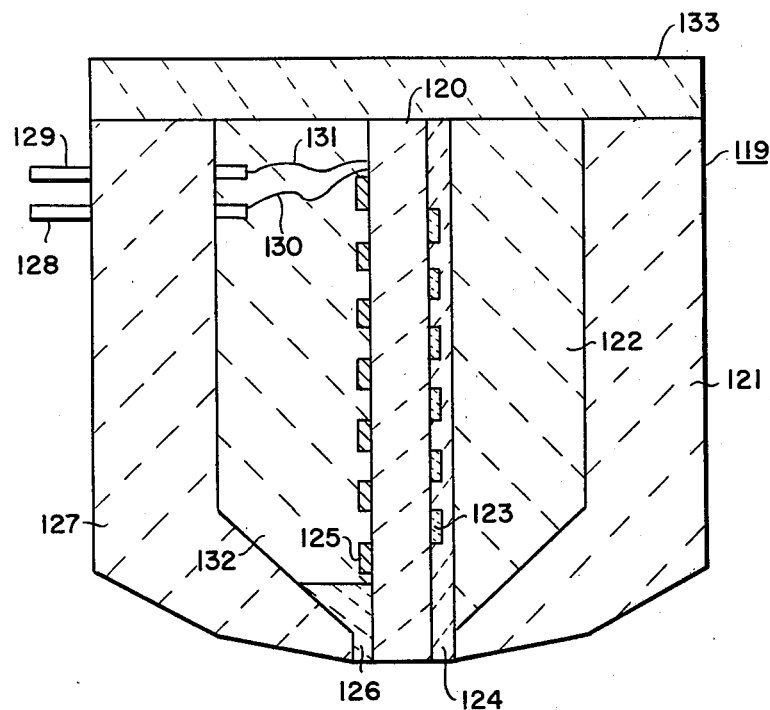
FIG. 9(A) is a sectional view showing a fifth embodiment of the present invention.
Figure 9B:
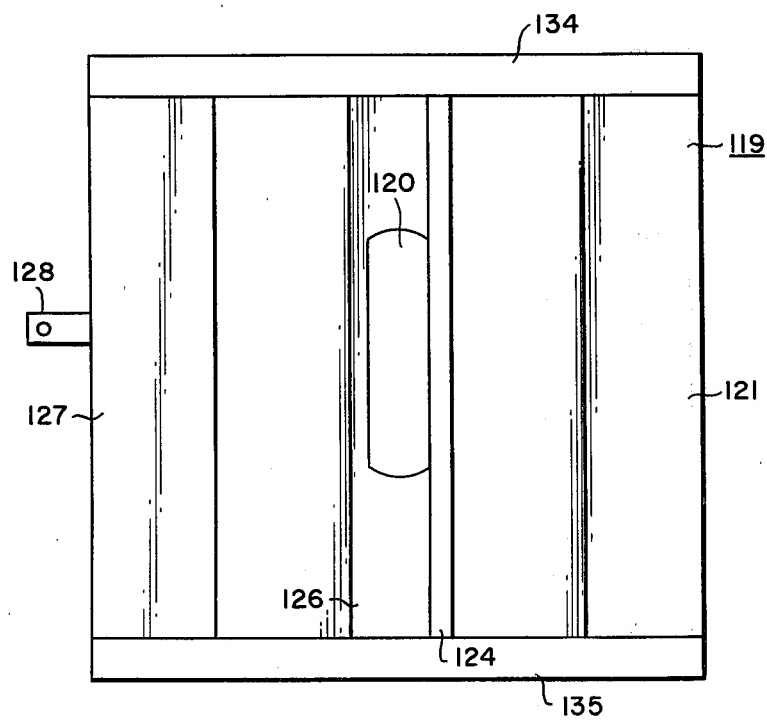
FIG. 9(B) is a side elevation showing the front portion of the same.
Figure 9C:
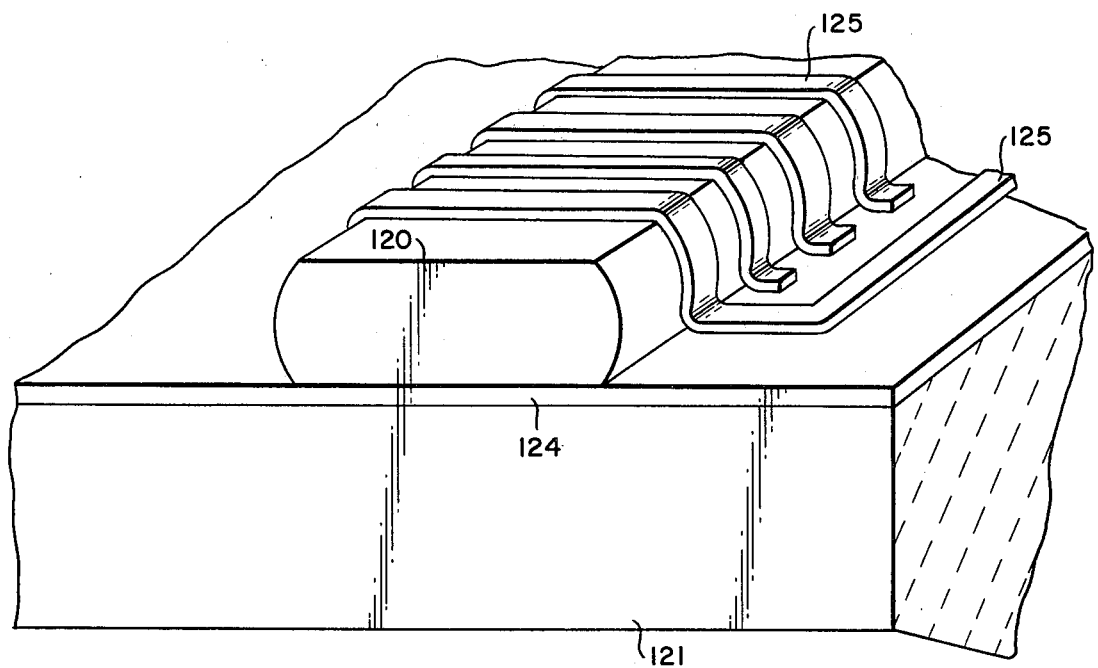
FIG. 9(C) is a perspective view showing the condition, under which a magnetic switching device is mounted.
Figure 9D:
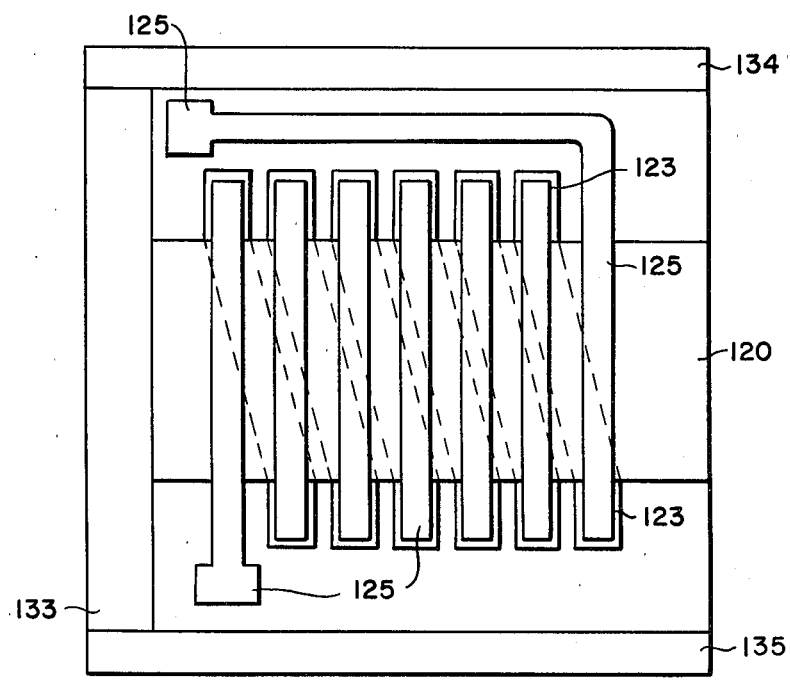
FIG. 9(D) is a view illustrating the wiring construction of the same.

FIG. 9(A) is a sectional view showing the magnetic head of the magnetic recording and reproducing system according to the fifth embodiment; FIG. 9(B) is a side elevation showing the front portion of the same; FIG. 9(C) is a perspective view showing the mounted condition of the magnetic switching device; and FIG. 9(D) shows the wiring construction of the same.

A magnetic head 119 of this embodiment uses as a magnetic switching device 120 the Wiegand effect type magnetic switching device, which is finished into a flattened shape by the etching method or the like, and is constructed by the use of a thin film producing technique. More specifically, a filler 122 is fitted in a magnetic shield 121, on which is formed a substrate layer 124 having a partial conductive layer 123 and made of a non-magnetic material. There is placed upon the substrate layer 124 the magnetic switching device 120, which is equipped with metal wiring 125 of aluminum or the like thereby to form the head and substrate. There are further formed a hard element 126 made of a hard material and a magnetic shield 127, and lead wires 130 and 131 are connected with output terminals 128 and 129. After that, a filler 132 is fitted in between, and a magnetic shield is applied by a rear magnetic shield 133.

As is apparent from FIG. 9(B), the upper and lower portions are coverted with magnetic shields 134 and 135. FIG. 9(C) shows the construction of the substrate; and FIG. 9(D) shows the wired condition when viewed from the above.

Since, as in the above, use in made of the thin film process for forming the detecting coil of the conductive layer 123 and the metal wiring 125, the mass-production can be effected by the single process with the resultant advantage that the multi-heads or the like can be produced at a low cost.

The foregoing description of the present invention has been made upon the embodiment, in which the well-known Wiegand wire is used as the magnetic switching device, with a view to facilitate the understanding thereof. However, the Wiegand wire has a limitation in its scale-down so that it cannot be used for the magnetic recording operation.

Moreover, in order to raise the density, i.e., to effect the scale-down of the magnetic switching device, it is necessary to use the plate-shaped magnetic switching device, as will be described in the following.

[EMBODIMENT 6]

Figure 10A:
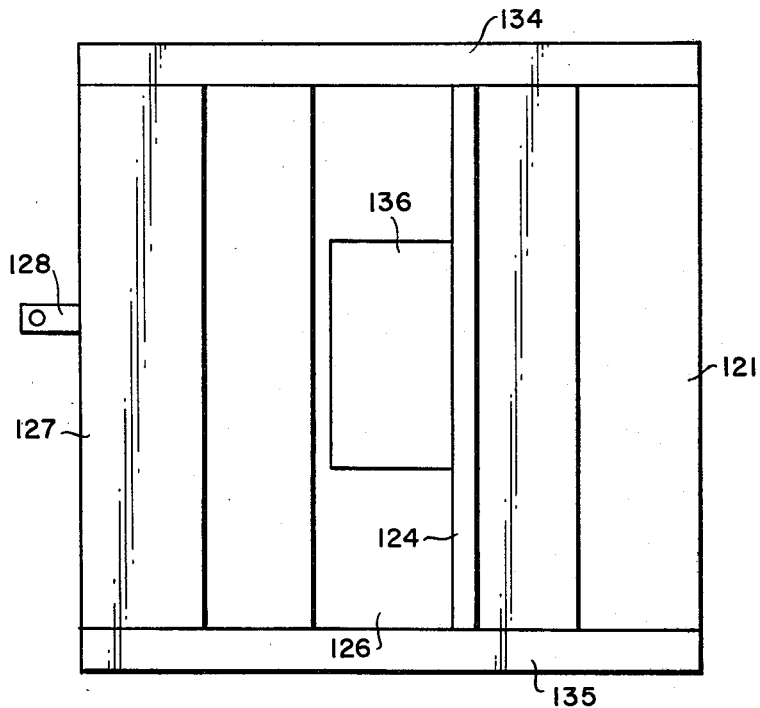
FIG. 10(A) is a side elevation showing the front portion of a sixth embodiment according to the present invention.
Figure 10B:
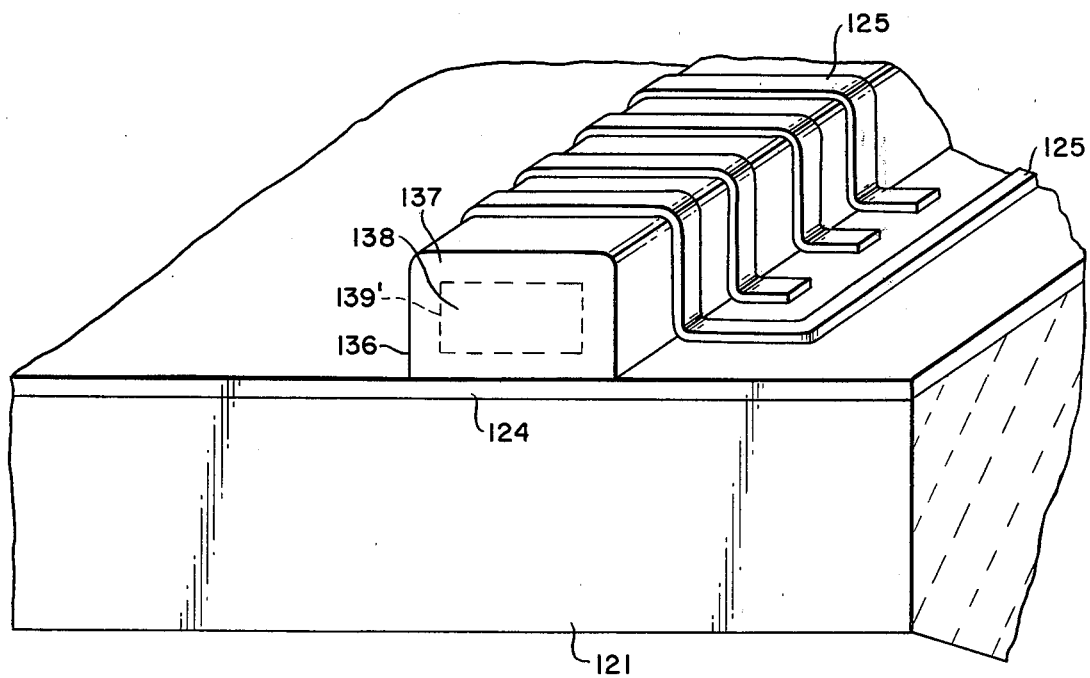
FIG. 10(B) is a view illustrating the condition, under which a magnetic switching device is mounted.
Figure 10C:
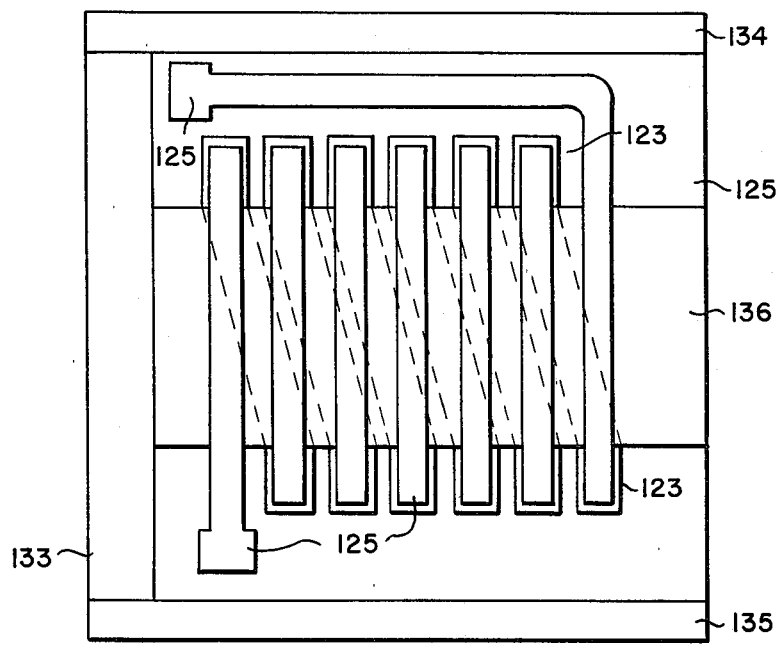
FIG. 10(C) is a view illustrating the wiring construction of the same.
Figure 10D:
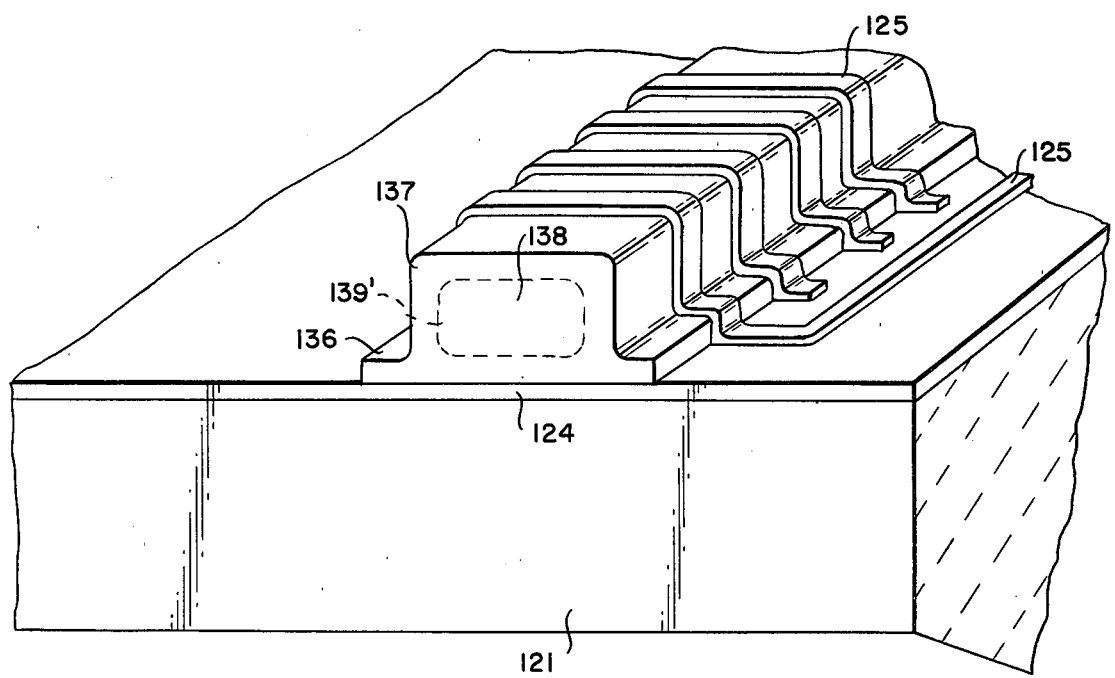
FIG. 10(D) is a view showing another example of the mounting condition of the magnetic switching device.

FIG. 10(A) is a front elevation showing the magnetic head of the magnetic recording and reproducing system according to the sixth embodiment; FIG. 10(B) is a perspective view showing the substrate, on which the magnetic switching device is placed; FIG. 10(C) is a view showing the wiring condition of the substrate; and FIG. 10(D) is a perspective view showing another example of the substrate.

The construction of the magnetic head is the same as that in the fifth embodiment excepting that a plate-shaped magnetic switching device is used. This plate-shaped magnetic switching device 136 is composed, as shown in FIGS. 10(B) and (C), of a high magnetic coercive portion 137 and a low magnetic coercive portion 138, the boundary in between being formed with a magnetic interlayer 139'. The low magnetic coercive portion 138 has its magnetic anisotropy in the longitudinal direction and is magnetically retained in the high magnetic coercive portion 137 so that it exhibits the magnetic switching phenomena when the magnetic field impressed reaches a threshold value so that it is released from the retained condition.

Generally speaking, in case the digital signals are to be recorded in the magnetic recording medium, the magnetized signals of one unit are recorded in a square region.

Since the cross-section of the magnetic switching device 136 is made square, the sixth embodiment has an advantage in that the magnetized signals recorded in the square region can be efficiently reproduced.

Incidentally, FIG. 10(D) is a perspective view showing the magnetic switching device having the laminated construction, in which there are placed upon the substrate 21 the high magnetic coercive portion, then the low magnetic coercive portion 128 and finally the high magnetic coercive portion 137.

Moreover, in case the size of the magnetic switching device is reduced, it is necessary to constitute the thin film type magnetic switching device in the magnetic head, as will be detailed in the following. The system using a magnetic thin film having two layers, i.e., the high and low magnetic coercive layers as the magnetic switching device is advantageous for the reproduction of the high density magnetic recorded signals.

[EMBODIMENT 7]

Figure 11A:
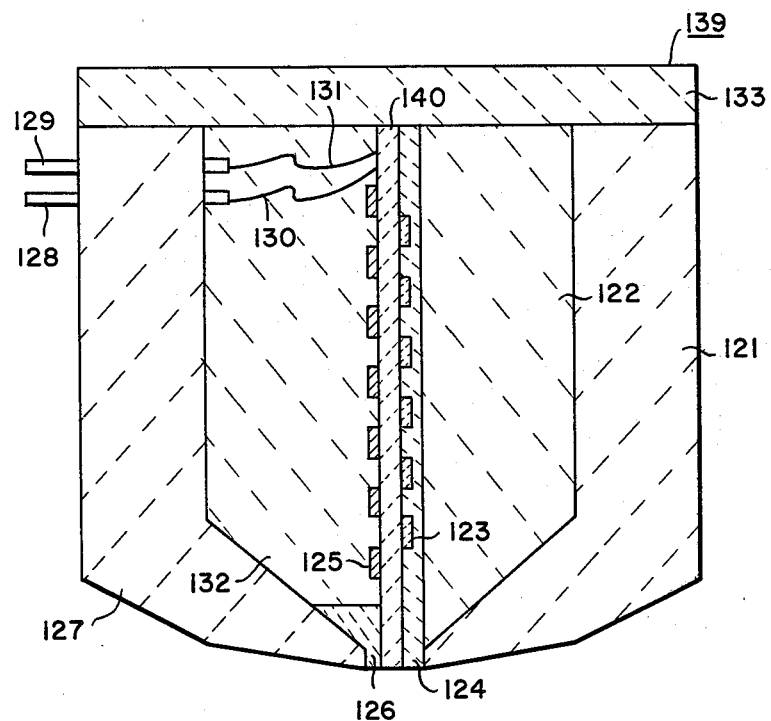
FIG. 11(A) is a sectional view showing a seventh embodiment of the present invention.
Figure 11B:
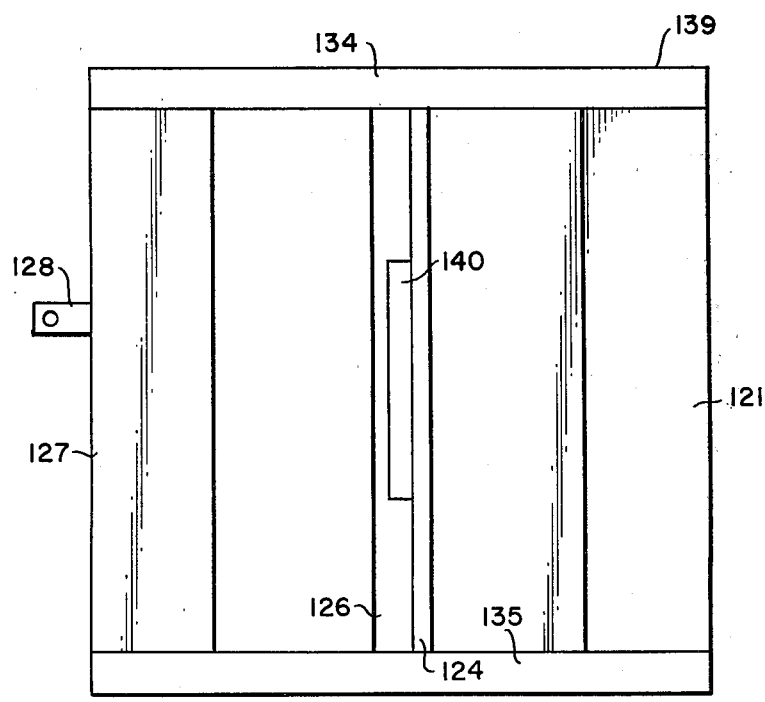
FIG. 11(B) is a side elevation showing the front portion of the same.
Figure 11C:
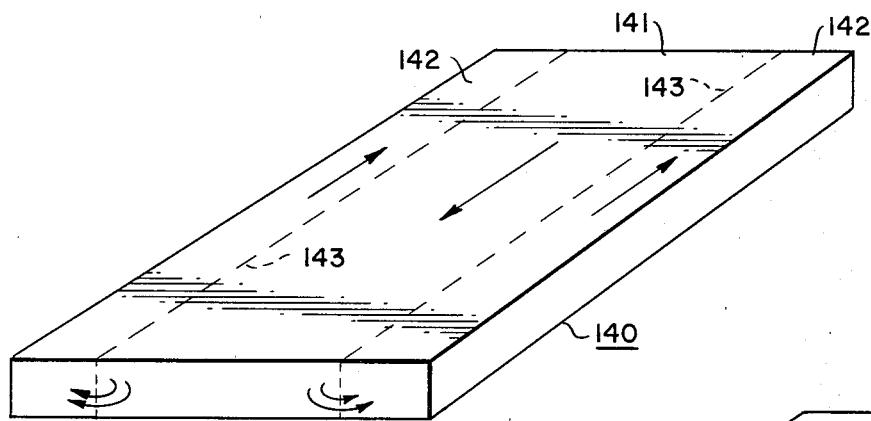
FIGS. 11(C) and (D) are perspective views illustrating the representative constructions of magnetic switching devices, respectively.
Figure 11D:
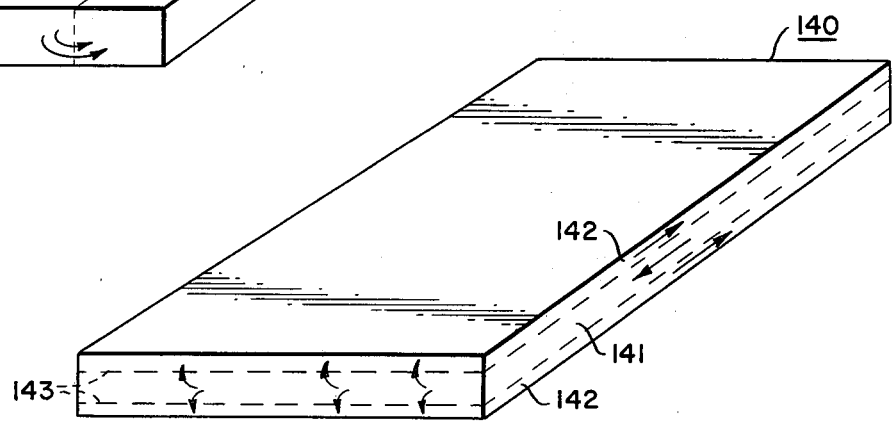
FIG. 11(E) is a view illustrating the wiring construction of the substrate of the same.
FIG. 11(F) is a perspective view showing the substrate portion of the same.
Figure 11E:
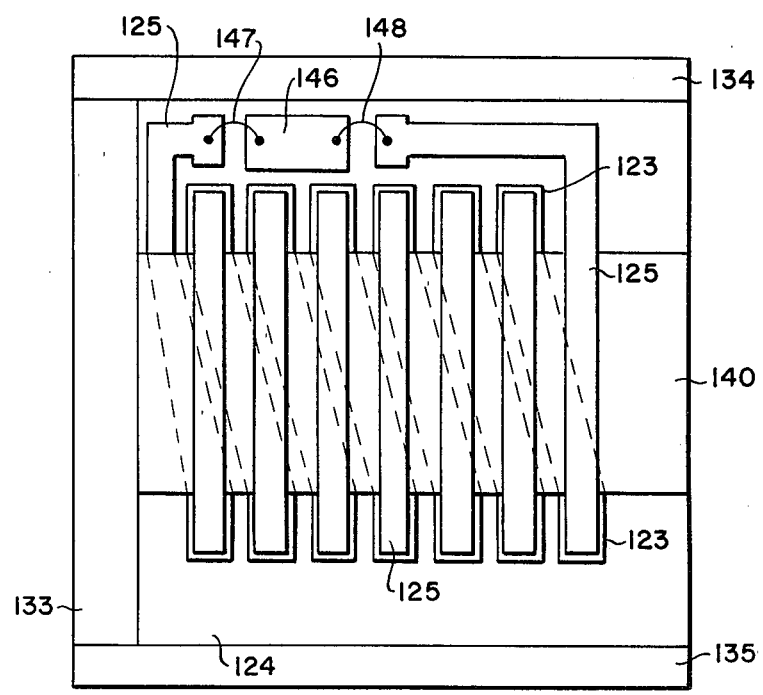
Figure 11F:
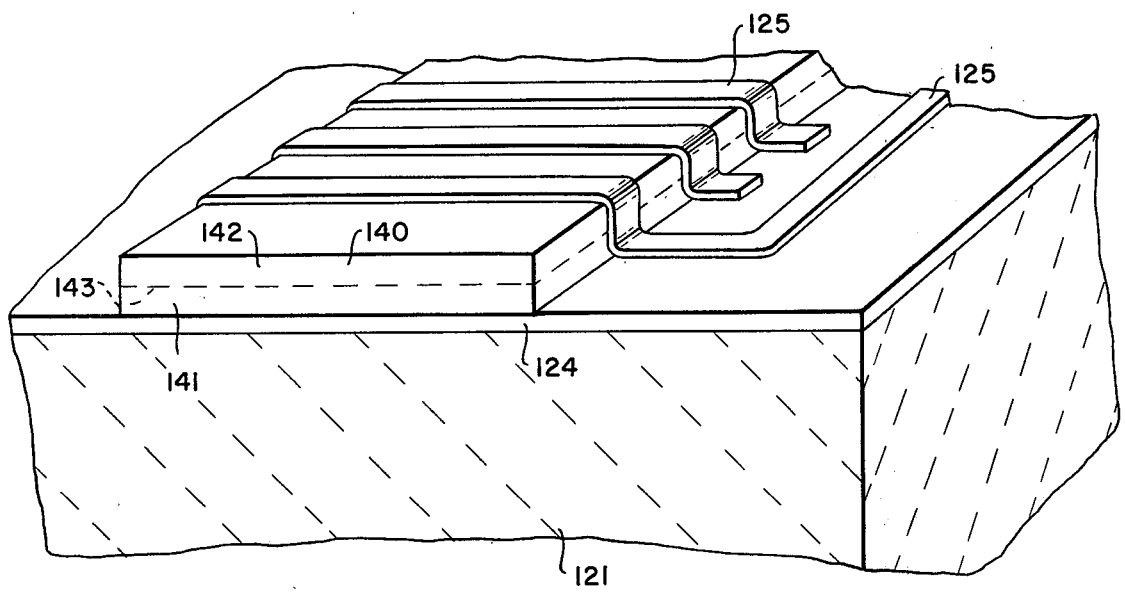

FIG. 11(A) is a sectional view showing the magnetic head according to the seventh embodiment; FIG. 11(B) is a side elevation showing the front portion of the same; FIGS. 11(C) and (D) are perspective views showing the magnetic switching devices; FIG. 11(E) shows the wiring condition of the substrate; and FIG. 11(F) is a perspective view showing the substrate.

In these Figures, the portions corresponding to the constructional components of the magnetic head of the fifth embodiment are indicated by the same numerals. The difference therefrom is that a magnetic switching device 140 having a thin film construction composed of two lower and higher magnetic coercive layers is used and that an IC chip of the drive detecting circuit is mounted on the substrate.

The magnetic switching device 140 is composed, as shown in FIGS. 11(C) and (D), of a magnetic composite material having a low magnetic coercive portion 141 and a high magnetic coercive portion 142 and has its axis of easy magnetization in the direction of the arrow. This arrow indicates the direction of magnetization under the opposite magnetized condition, and numeral 143 indicates the magnetic interlayer between the low magnetic coercive portion 141 and the high magnetic coercive portion 142. Since the magnetic switching device 140 is composed of the two low and high magnetic coercive layers, the inside low magnetic coercive portion 141 is magnetically retained in the outside high magnetic coercive portion 142. When the magnetic field applied reaches a preset magnetic field so that the lower magnetic coercive portion 141 is released from its retained condition by the high magnetic holding portion 142, inversions of magnetization are established all at once in the low magnetic coercive portion 141 to thereby exhibit the magnetic switching phenomena.

FIG. 11(E) shows the wiring condition of the thin film construction, under which the IC chip 146 having the drive detecting circuit integrated into one chip is mounted in the substrate 124, as has been explained in the foregoing first, second and third embodiments. Numerals 147 and 148 indicate the wire bonding portions with the detecting coil. Incidentally, neither power source nor wiring is shown in the Figures.

Since, in this embodiment, the magnetic switching device 140 and the wiring are constructed by the thin film process, it is possible to effect the mounting operations in higher density and accuracy. On the other hand, since the IC chip 146 of the drive detecting circuit is mounted in the head substrate 124, high digital signal outputs can be fed directly out of the output terminals 128 and 129 of the magnetic head so that they can be used for the application with many external noises.

Since, on the other hand, the magnetic coercive force of the magnetic switching device 140 has a temperature dependency, the threshold values, at which the magnetic inversions are established all at once, are different. Therefore, when the bias magnetic field is impressed, as in the third embodiment, the magnetic inversion may possibly take place due to the temperature change of the threshold values to thereby effect a malfunction. This malfunction can be obviated by providing a temperature detecting element in the magnetic head to thereby compensate for the temperature of the bias magnetic field. In this embodiment, however, since the IC chip 146 of the head substrate 124 is sufficiently coupled thermally with the magnetic switching device 140, there can be obtained an advantage in that the circuit design is made to effect the temperature compensation of the bias magnetic field in accordance with the temperature changes or the temperature compensating portion is disposed in the IC chip so that the temperature compensation can be easily accomplished.

Incidentally, the construction of the thin film magnetic switching device 140 is not limited to those shown in FIGS. 11(C) and (D) but can be of any two-layered configuration exhibiting the magnetic switching characteristics if it is composed of at least two high and low magnetic coercive layers.

For example, the desired magnetic switching device can be produced by evaporating onto the substrate with a material of Fe, Co or Ni having a low magnetic coercive force of several oersteds and then with a material having a high magnetic coercive force of several tens of oersteds.

If, moreover, such a composite magnetic construction is made as has its one magnetic portion retaining the magnetization of the other magnetic portion, the present invention can also be practised by another material or construction.

[EMBODIMENT 8]

Figure 12A:
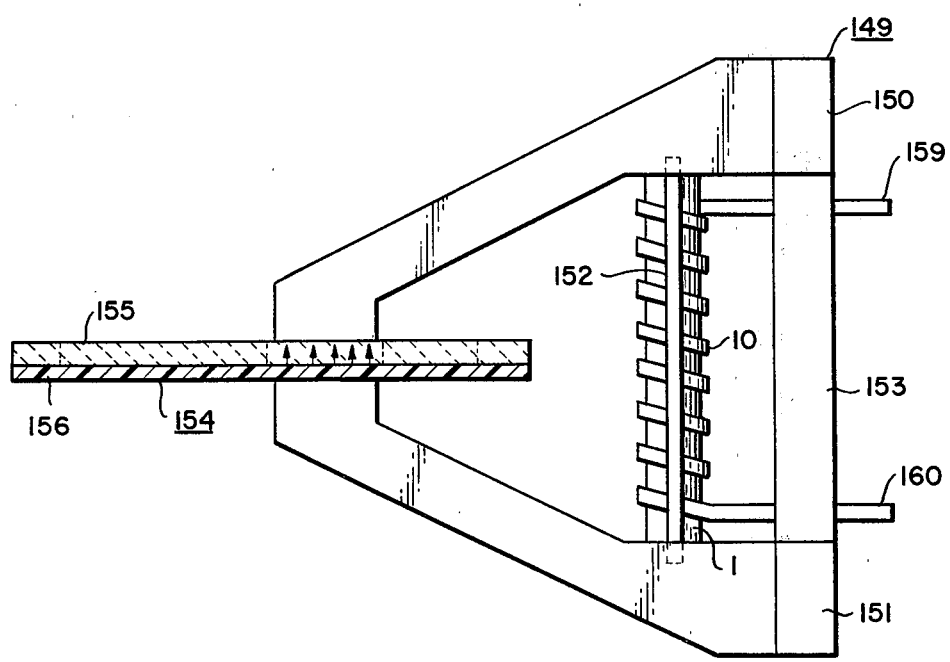
FIG. 12(A) is a side elevation showing an eighth embodiment of the present invention.
Figure 12B:
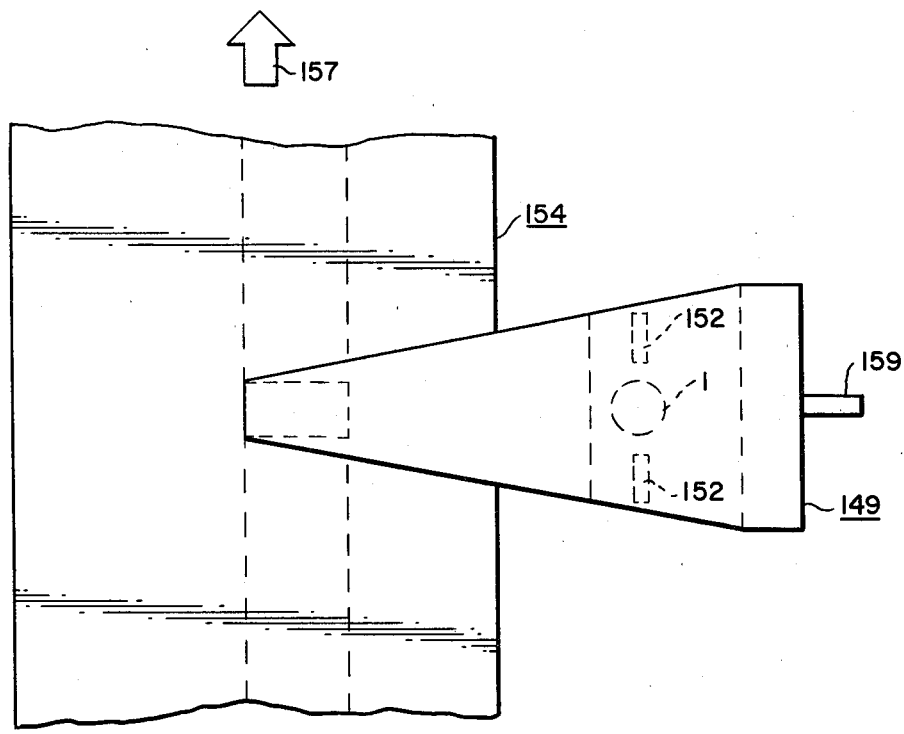
FIG. 12(B) is a top plan view of the same.

FIG. 12(A) is a side elevation of the magnetic head of the magnetic recording and reproducing system according to the eighth embodiment; and FIG. 12(B) is a top plan view of the same.

In these Figures, numeral 1 indicates a magnetic switching device, on which the coil 10 is wound and which has its both ends magnetically coupled with upper and lower cores 150 and 151 made of a highly permeable magnetic material. These upper and lower cores 150 and 151 are so constructed that a magnetic recording medium 154 is always compressed under a preset pressure by an elastic portion 153, which exhibits an extending elasticity in the longitudinal direction about the two supports 152 which are disposed at the center. The magnetic recording medium 154 is composed of a magnetic layer 155 and a base film 156 and is driven to run in the direction of arrow 157. The output of the magnetic head 149 is introduced to the outside through output terminals 159 and 160.

In the case of the magnetic head of this embodiment, the reproducing principles of the recorded signals are absolutely the same as those of the first and second embodiments such that the magnetic switching device 1 is driven by the magnetic field which is generated in the magnetic circuit in the magnetic head 149 in response to the perpendicular magnetized signals recorded in the magnetic recording medium 154 runing in the direction of the arrow 157. As is apparent from the Figure, since the closed magnetic passage is established by the upper and lower cores 150 and 151 and the magnetic switching device 1, there can be attained an advantage that high reproduced output can be generated. Since the recording medium is always clamped under a preset pressure, the system being described can be said that which is suitable for the magnetic card, especially, for the hard magnetic recording medium. Since the interference from the adjoining track or the preceding or subsequent magnetized signals are eliminated, it is possible to reproduce the recorded signals of higher density if there is provided a magnetic shield plate (not shown) similar to that of the other embodiments.

[EMBODIMENT 9]

Figure 13A:
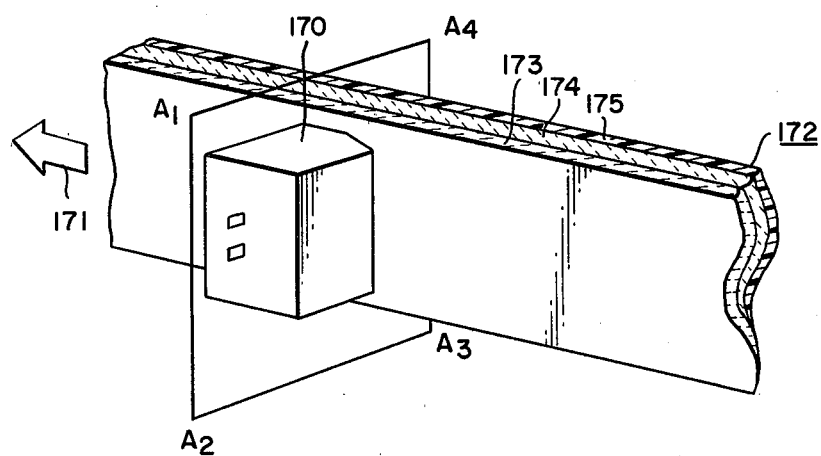
FIG. 13(A) is a perspective view illustrating the positional relationship between a magnetic head and a magnetic head of a ninth embodiment of the present invention.
Figure 13B:
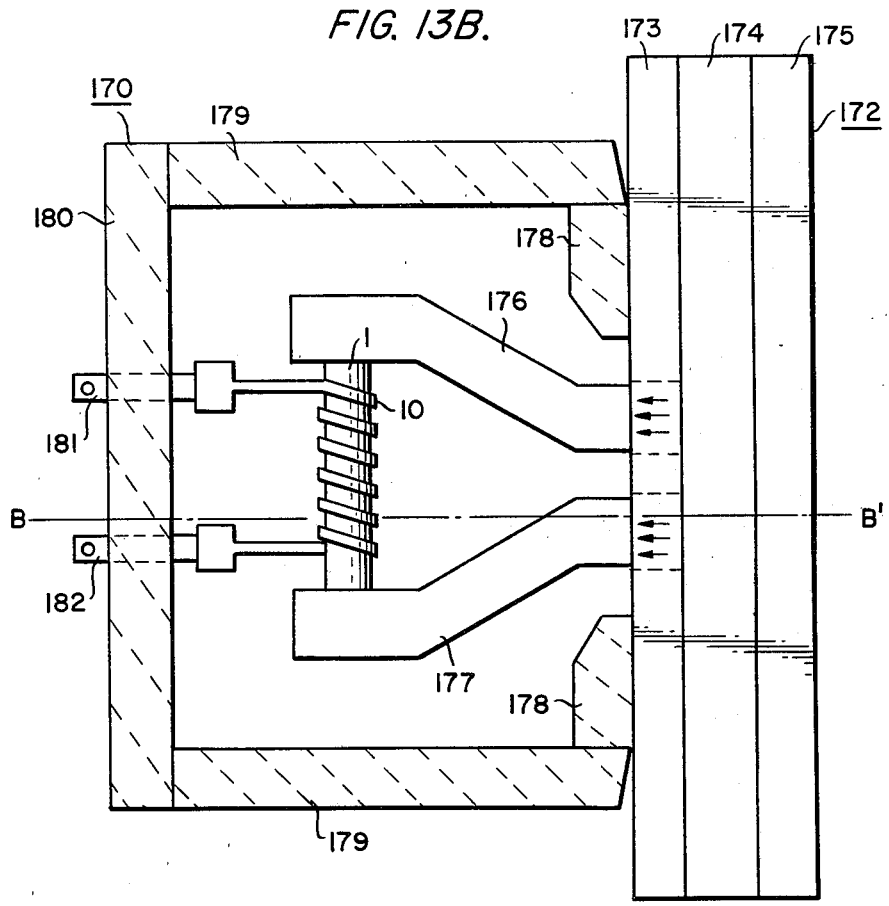
FIG. 13(B) is a section taken along planes A1 to A4 of the same.
Figure 13C:
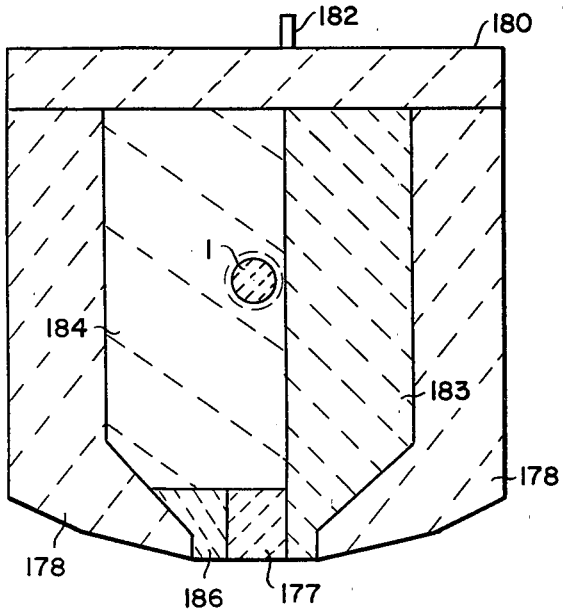
FIG. 13(C) is a section taken along line B-B' of FIG. 13(B)
Figure 13D:
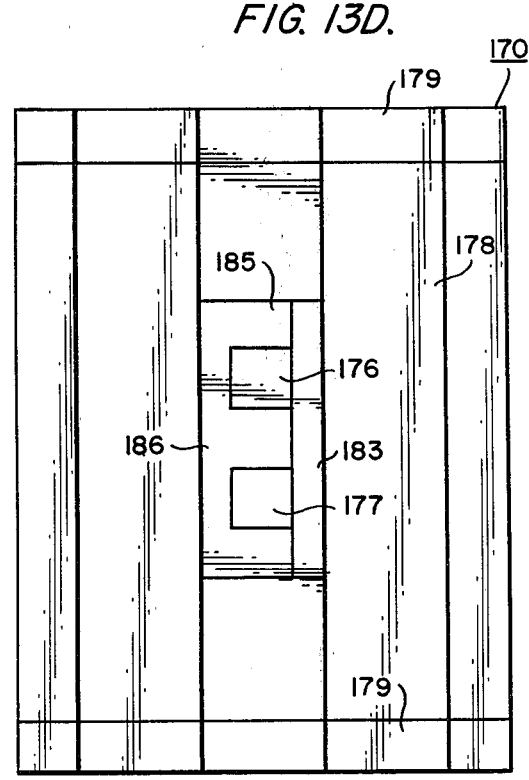
FIG. 13(D) is a side elevation showing the front portion thereof.

FIG. 13(A) is a perspective view showing the positional relationship between the magnetic head and the magnetic tape of the magnetic recording and reproducing system according to the ninth embodiment; FIG. 13(B) is a section taken along plane A1 to A4; FIG. 13(C) a section taken along line B—B' of FIG. 13(B); and FIG. 13(D) is a side elevation showing the front portion of the same.

In these Figures, a magnetic head 170 is in contact with the magnetic tape 172 which is driven to run in the direction of arrow 171. The magnetic tape 172 has a three-layered construction composed of a magnetic layer 173 having a high magnetic coercive force, a highly permeable layer 174 having a low magnetic coercive force, and a supporting layer 175. In the magnetic head 170, as shown in FIG. 13(B), the upper and lower cores 176 and 177 made of a highly permeable material are magnetically coupled with the magnetic switching device 1 which is wound with the coil 10. In order to avoid interfering magnetic fields and disturbances due to other magnetizing signals, there are arranged around the magnetic switching device 1 two magnetic shields 178 and 179 and a rear magnetic shielding plate 180, which is equipped with two output terminals 181 and 182 leading to the outside. As seen from FIG. 13(C), moreover, a substrate 183 is equipped with the wiring and is fixed by a filler 184. As seen from FIGS. 13(C) and (D), moreover, an aperture 185 is filled up with a hard element 186 of glass.

The operating principles of the magnetic head 170 according to this embodiment are the same as those of the other embodiments. Since, however, the closed magnetic path is defined by the upper core 176, the magnetic switching device 1, the lower core 177 and the highly permeable layer 174, the magnetic resistance is nothing but the space loss which is established among the magnetic tape 172, the upper core 176 and the lower core 177. As a result, there can be attained an advantage in that a large quantity of magnetic flux can be generated while enhancing the sensitivity. Moreover, the highly permeable layer 174 of the magnetic tape 172 can be less obstructed by the other magnetizing signals by arranging the magnetic layer 174 in a plane and by arranging the axis of easy magnetization in the direction perpendicular to the running direction 171.

[EMBODIMENT 10]

Figure 14A:
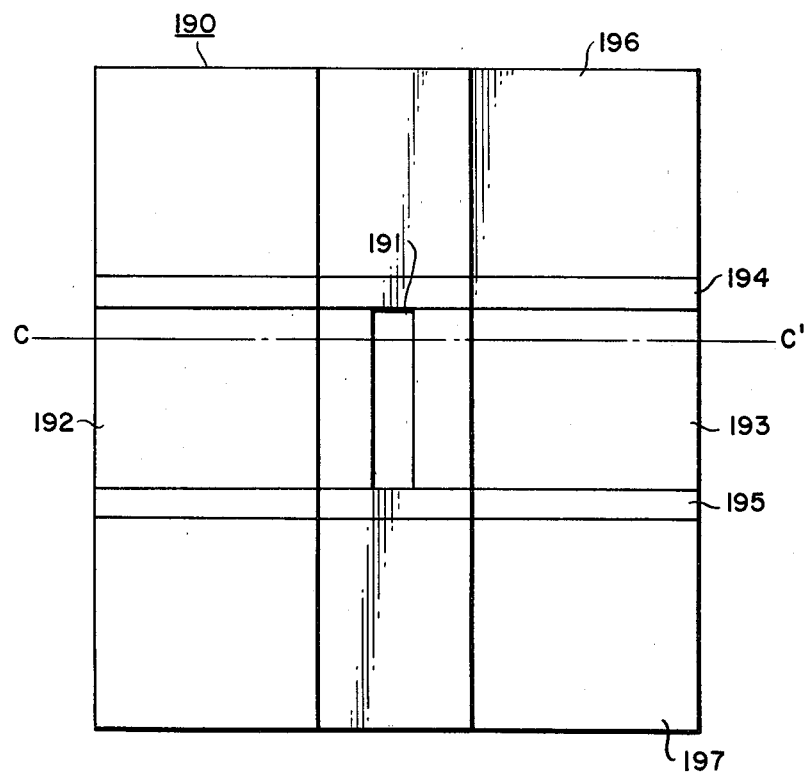
FIG. 14(A) is a side elevation showing the front portion of a tenth embodiment of the present invention.
Figure 14B:
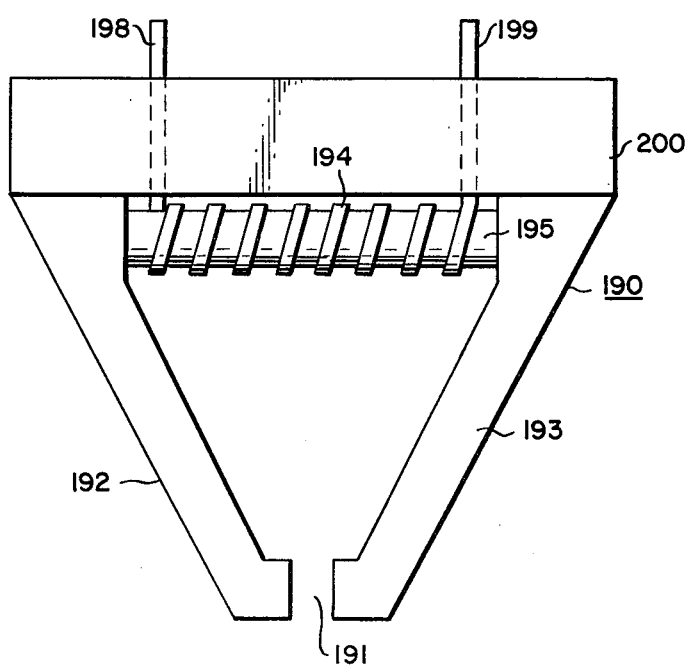
FIG. 14(B) is a section taken along line C-C' of the same.
Figure 14C:
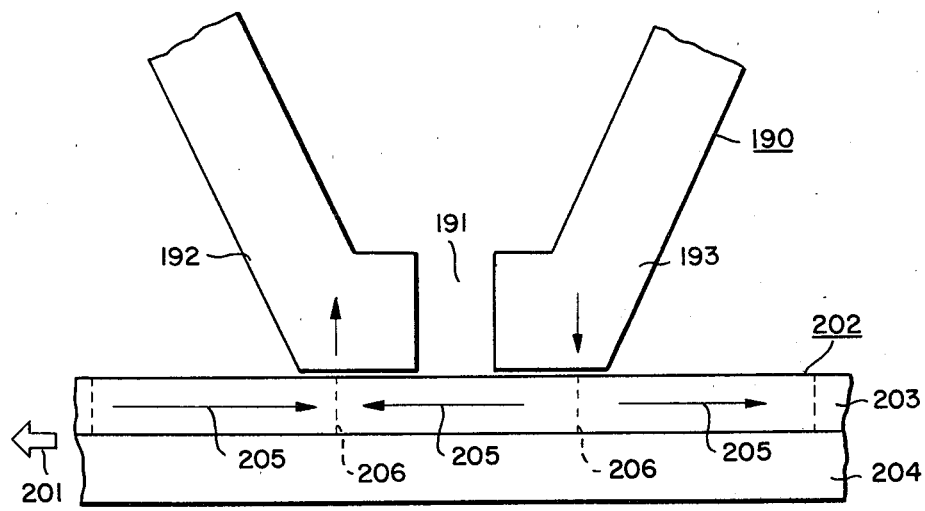
FIG. 14(C) is a sectional view of an essential portion of the same for illustrating the relationship with a magnetic recording medium.

FIG. 14(A) is a side elevation showing the front portion of the magnetic head of the tenth embodiment; FIG. 14(B) is a section taken along line C-C' of the same; and FIG. 14(C) is an enlarged view showing the head.

In FIG. 14(A), the magnetic head 190 is constructed to include right and left cores 192 and 193 having a magnetic gap 191 in between, magnetic shield plates 194 and 195, an upper core 196 and a lower core 197. As shown in FIG. 14(B), there is interposed between the left core 192 and the right core 193 a magnetic switching device 195, which is wound with a coil 194, such that it is magnetically coupled with the cores 192 and 193. The head output is lead out of terminals 198 and 199. Numeral 200 indicates a rear terminal plate which is made of a non-magnetic material. The gap 191 of the magnetic head 190 is shown in FIG. 14(C). A horizontal recording magnetic tape 202, which is driven to run in the direction of arrow 201, is composed of a magnetic layer 203 having planar magnetic anisotropy and a base film 204. Arrow 205 indicates the direction of the recorded signals which are horizontally magnetized, and broken lines 206 indicate the boundaries of the magnetic walls.

According to the tenth embodiment, a magnetic flux is established in the magnetic head 190 by the horizontal magnetized signals of the magnetic tape 202 facing each other. In accordance with the running operation of the magnetic tape 202, therefore, there arise the changes in the magnetic field in the magnetic switching device 195 in response to the magnetized signals so that the pulse output is attained in a similar manner to the aforementioned respective embodiments, thus making it possible to demodulate the series digital signals.

[EMBODIMENT 11]

Figure 15A:
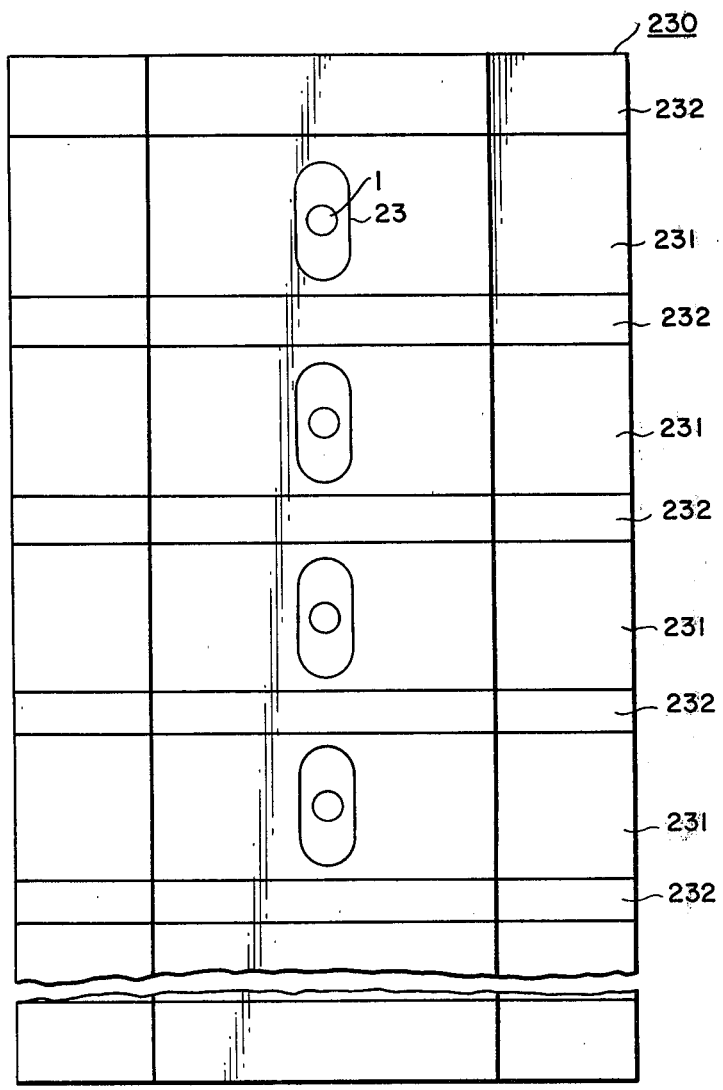
FIG. 15(A) is a side elevation showing the front portion of a eleventh embodiment of the present invention.
Figure 15B:
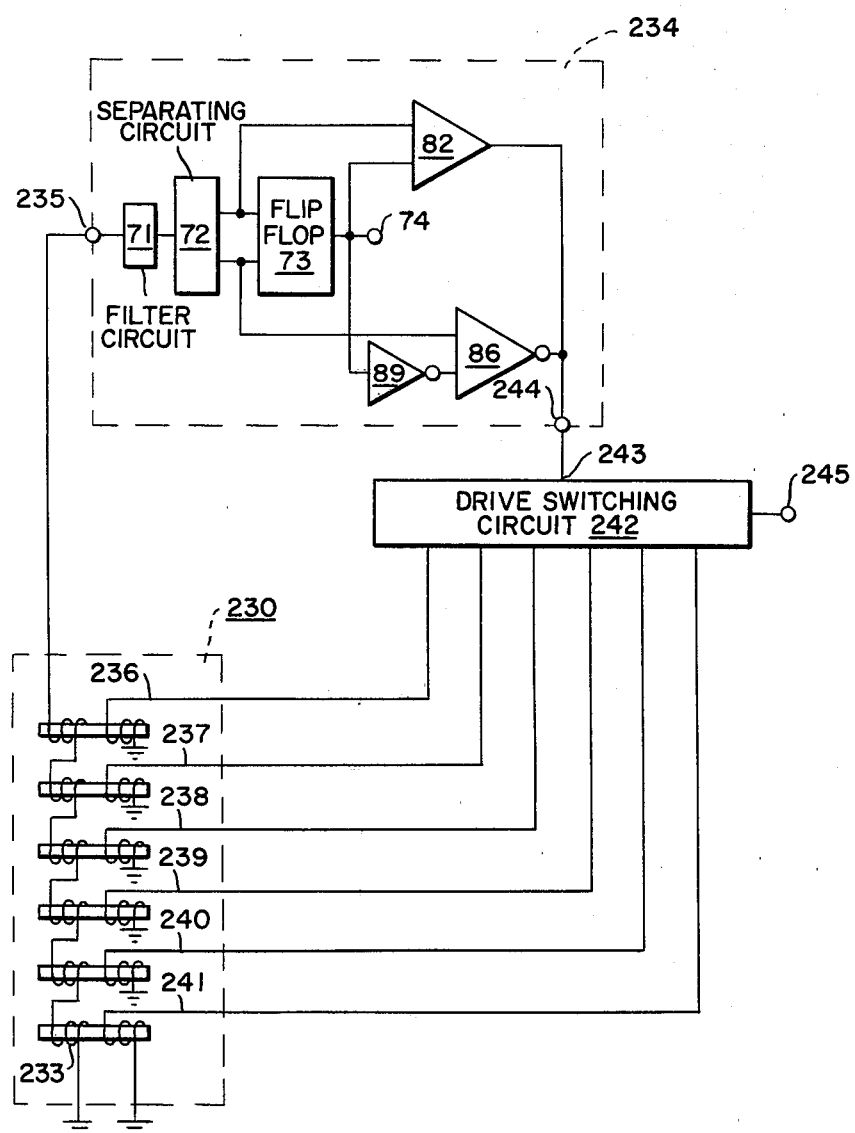
FIG. 15(B) is a block diagram showing the construction of a demodulating circuit using the same embodiment.

FIG. 15(A) is a side elevation showing the front portion of the magnetic head of the magnetic recording and reproducing system according to the eleventh embodiment; and FIG. 15(B) is a block diagram of the same.

A magnetic head 230 according to this embodiment is constructed by piling a plurality of magnetic head elements 231, which are similar to those of the aforementioned embodiments, through magnetic shields 232. In the magnetic head 230 thus constructed, the outputs of the respective magnetic head elements 231 can be detected independently of one another. If, as shown in FIG. 15(B), the magnetic head elements 231 have their detecting coils 233 connected in series with one another and with the input terminal 235 of the drive detecting circuit 234 shown in the second embodiment, the circuit construction can be remarkably simplified. In this construction, the drive coils, which are arranged around the respective magnetic switch elements 1 of the magnetic head elements 231, are wired independently of one another and are connected with the respective output terminals of a drive switching circuit 242. The input terminal of this drive switching circuit 242 is connected with the output terminal 244 of the drive detecting circuit 234.

If the drive switching circuit 242 has its selected signal input terminal 245 supplied with the selected signals, some of the drive coils 237 to 241 of the magnetic head 230, which is to be driven, is selected by the drive switching circuit 242. As a result, in accordance with the signal magnetic field by the magnetic recording medium, the pulse output is generated only in the detecting coil of the magnetic head elements which have their drive coils selected and is impressed upon the input terminal 235 of the drive detecting circuit 234.

In this embodiment, so long as no bias magnetic field is impressed as in the third embodiment, the magnetic field of the magnetizing signals is set so that the magnetization inversion of the magnetic switching device 1 may not take place. Then, the magnetization invertion does not take place in the magnetic switching device 1 of the magnetic head elements which are not selected by the drive switching circuit 242 so that no pulse voltage is generated in the detecting coils.

By the construction thus made, it is unnecessary to mechanically move the magnetic head up and down to thereby select the track of the magnetic recording medium. And, since the detecting coil 233 dealing with weak signals is not switched but rather the drive coil dealing with stronger signals is switched, the circuit construction can be remarkably simplified.

[EMBODIMENT 12]

Figure 16A:
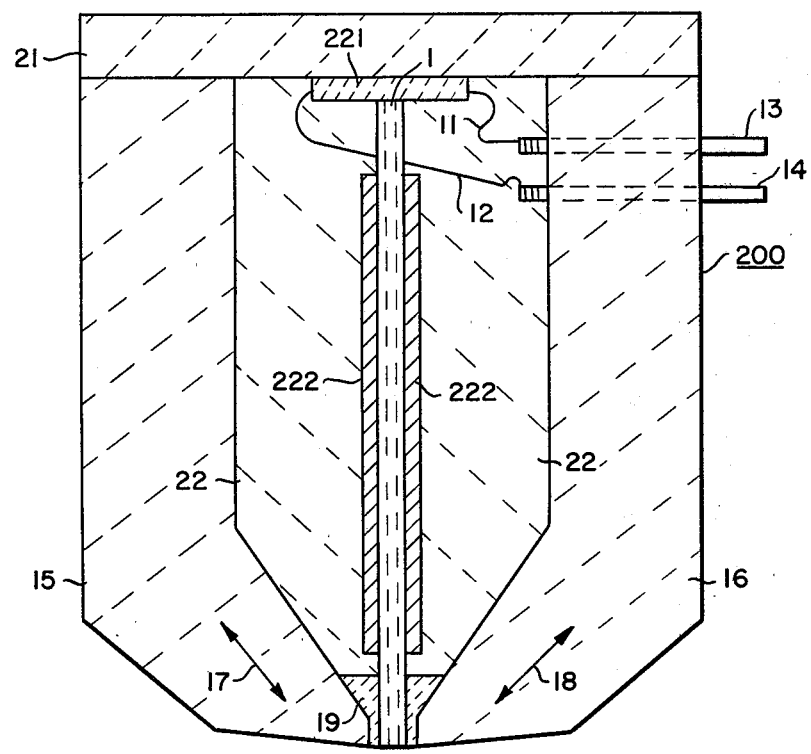
FIG. 16(A) is a sectional view showing a twelfth embodiment of the present invention.
Figure 16B:
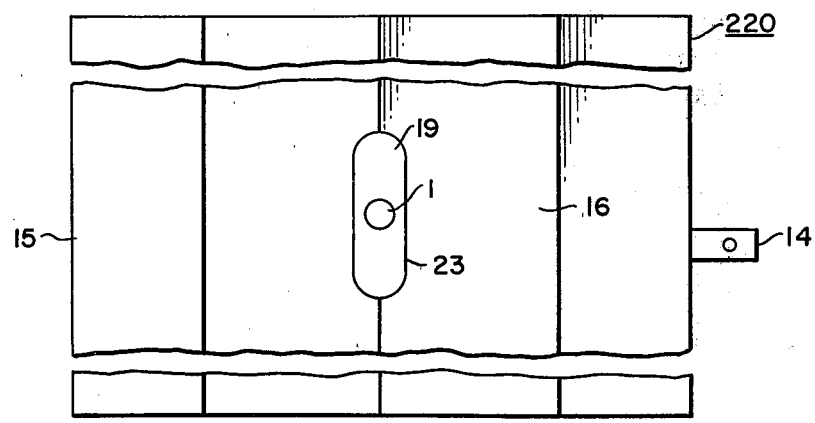
FIG. 16(B) is a side elevation showing the front portion of the same.

FIG. 16(A) is a sectional view showing the magnetic head of the magnetic recording and reproducing system according to the twelfth embodiment; and FIG. 16(B) is a side elevation showing the front portion of the same.

In these Figures, those elements corresponding to the constructional components of the magnetic head of the first embodiment are indicated by the same numerals.

The most significant feature of this twelfth embodiment is that the magnetic switching of the magnetic switching device 1 is detected by the use of the magnetic flux response type magnetic detector such as a Hall effect element or a magneto-resistance effect element. As shown, in place of the detecting coil thus far described, there is arranged at the terminal end of the magnetic switching device 1 a magneto-resistance effect element 221, and a drive coil 222 is wound on the device 1.

In response to the magnetized signals of the magnetic recording medium, the magnetization inversion of the magnetic switching device 1 is established. Thus, the magnetic flux change becomes highly binary, as shown in FIG. 4(I). These changes are detected by the magnetic flux response type magnetic detector and processed by the known demodulating circuit so that the digital signals can be reproduced. In order to enhance the sensitivity, a weak bias magnetic field can be impressed, as has been described in the second embodiment. If, in this instance, the magneto-resistance effect type element is used as the magnetic flux response type magnetic detector, the bias magnetic field for enhancing the sensitivity of the magneto-resistance effect type element can also be used as the aforementioned bias magnetic field.

[EMBODIMENT 13]

Figure 17A:
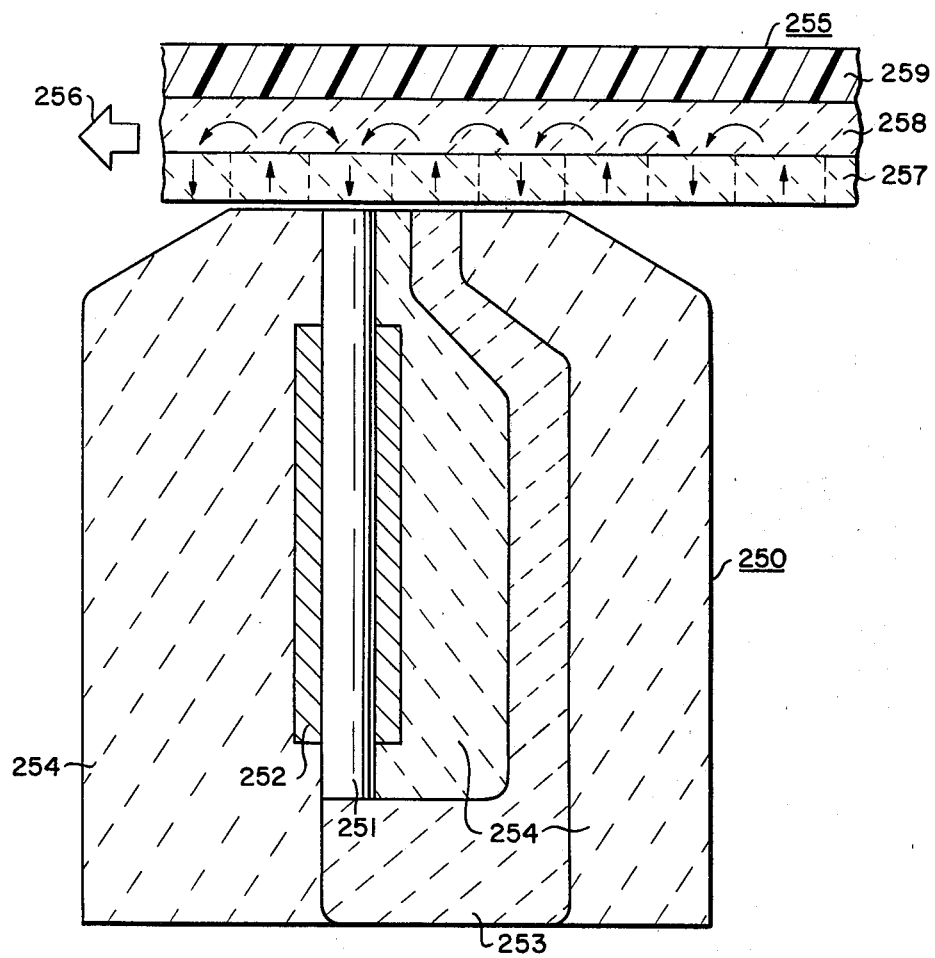
FIG. 17(A) is a transverse section showing a thirteenth embodiment of the present invention.
Figure 17B:
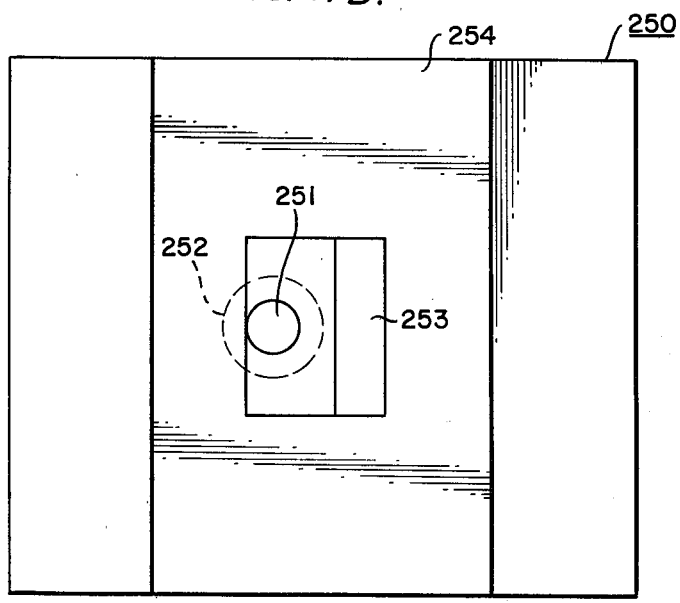
FIG. 17(B) is a side elevation showing the front portion of the same.

FIG. 17(A) is a sectional view of the magnetic head of the magnetic recording and reproducing system according to the thirteenth embodiment; and FIG. 17(B) is a top plan view of the same.

As shown, the center portion 251 of a magnetic head 250 is a magnetic switching device of magnetic thin film type, which is composed of two high and low magnetic coercive layers and which is wound with a coil 252. The magnetic switching device 251 is constructed to include a yoke portion 253, which is made of a highly permeable magnetic material, and a component 254 which is magnetically coupled with the yoke portion 253 and which is covered with a non-magnetic hard material such as glass. Numeral 255 indicates a magnetic recording medium which is driven to run in the direction of arrow 256 and which is composed of three layers, i.e., a highly permeable magnetic layer 257 having its axis of easy magnetization oriented at a right angle with respect to the side of the medium, a highly permeable magnetic layer 258 of Mo permalloy, and a holding layer 259. In the magnetic layer 257, arrows indicate the direction of magnetization of the recorded signals, and broken lines indicate magnetic walls. In the highly permeable layer 258, on the other hand, arrows indicate the direction of lines of magnetic force.

The operating principles of the magnetic head 250 according to the thirteenth embodiment are absolutely the same as those of the first and second embodiments. Since the three-layered magnetic recording medium is used and since the yoke portion 253 is provided, the single closed magnetic path is defined by the magnetic switching device 251, the magnetic layer 257, the highly permeable layer 258 and the yoke portion 253 with the resultant effect that a remarkably high magnetic flux can be established while enhancing the sensitivity.

As to the reproducible wavelength, on the other hand, it is sufficient according to the present invention to detect the boundary of inversion of the magnetic recorded signals. As a result, all the signals having a wavelength twice the gap, i.e., the spacing between the sides of the magnetic switching device 251 and the yoke portion 253, which contact with the magnetic recording medium, can be reproduced.

Although, incidentally, there is disclosed in this embodiment the three-layered magnetic recording medium, similar effects can also be attained even by the use of the existing medium having the two-layer construction. In the case of the two-layered magnetic recording medium, however, the sensitivity is slightly deteriorated.

Figure 17C:
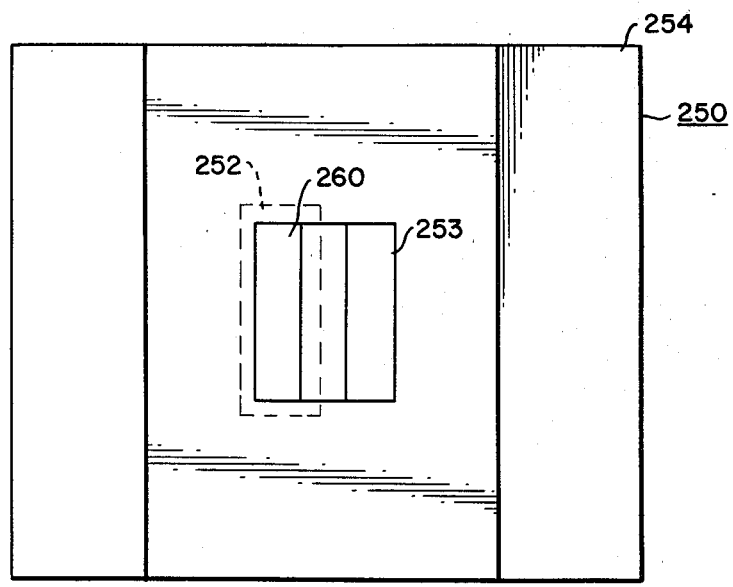
FIG. 17(C) is a side elevation showing the front portion of another example of construction.

Moreover, although the description of the embodiment thus far made is directed to the thin film type magnetic switching device 251, this switching device 251 having a circular section, as shown in FIG. 17(B), can be replaced by a switching device 260 having a rectangular section, as shown in FIG. 17(C).

[EMBODIMENT 14]

Figure 18A:
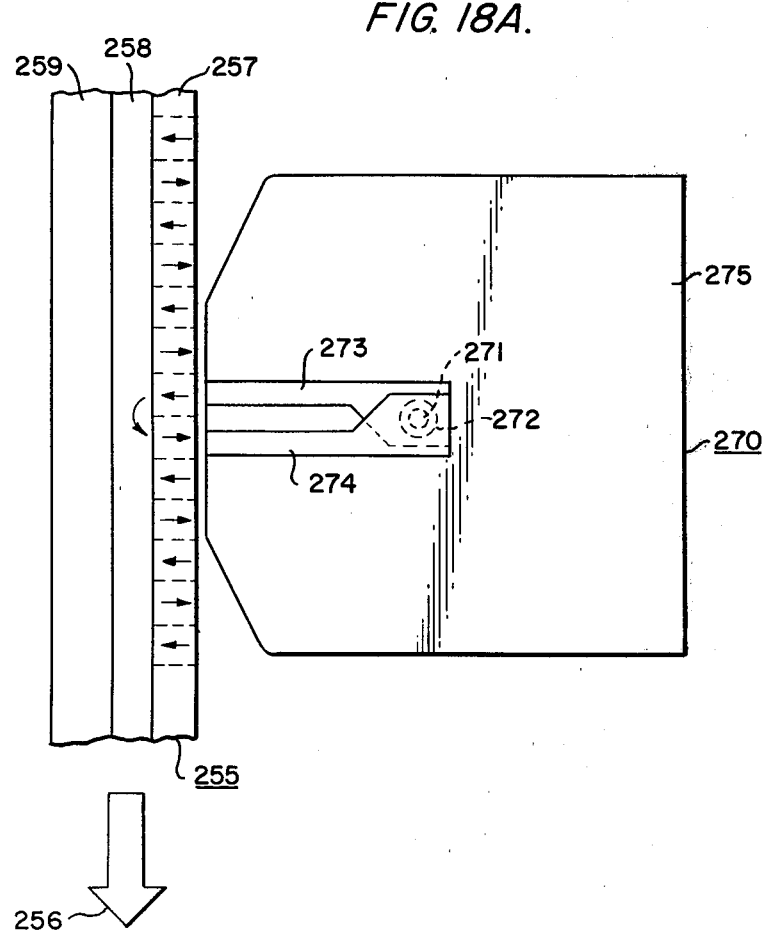
FIG. 18(A) is a transverse section showing a fourteenth embodiment of the present invention.
Figure 18B:
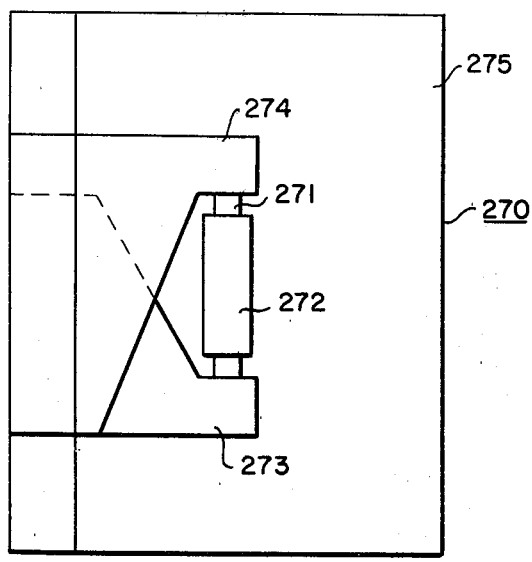
FIG. 18(B) is a side elevation of the same.

FIG. 18(A) is a top plan view showing the magnetic head of the magnetic recording and reproducing system according to the fourteenth embodiment; and FIG. 18(B) is a side elevation showing the same magnetic head.

As shown, the constructional components of the magnetic recording medium corresponding to those of the thirteenth embodiment are indicated by the same numerals.

In a magnetic head 270, numeral 271 indicates a magnetic switching device of cylindrical shape, which is equipped with a coil 272. The magnetic switching device 271 is magnetically coupled with two cores 273 and 274 and is surrounded by a very hard layer 275 of glass or the like.

This fourteenth embodiment is made basically the same as the thirteenth embodiment excepting that the magnetic switching device 271 is not exposed directly to the outside because the two cores 273 and 274 are used to form the single gap to thereby form the closed magnetic path covering the magnetic switching device 271 itself and that gap.

Therefore, the shape and construction of the magnetic switching device are arbitrary to thereby reduce the possibility of wear and the generation of sliding noises.

By using the thin film type as the magnetic switching device 271, moreover, the two cores 273 and 274 can also be produced at the same time by the thin or thick film producing technique. Therefore, the production cost can be further reduced.

[EMBODIMENT 15]

Figure 19A:
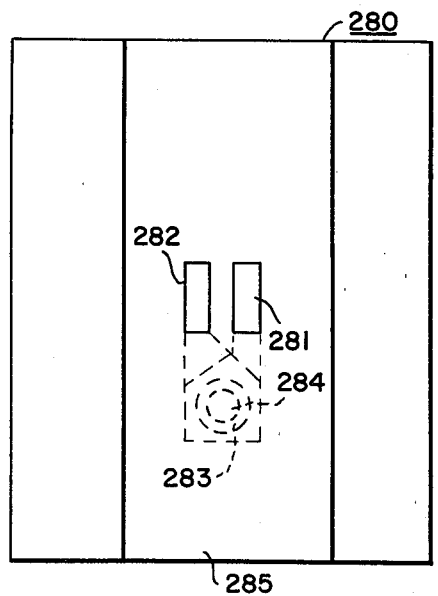
FIG. 19(A) is a side elevation showing the front portion of a fifteenth embodiment of the present invention.
Figure 19B:
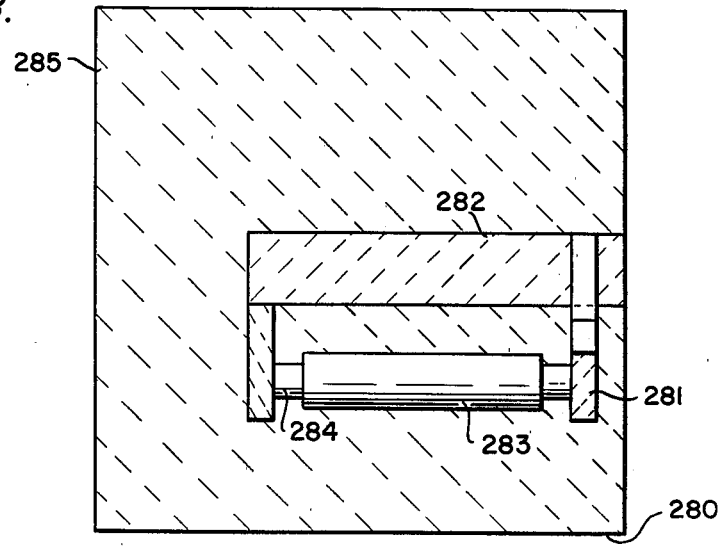
FIG. 19(B) is a transverse section of the same.

FIG. 19(A) is a side elevation showing the front portion of the magnetic head of the magnetic recording and reproducing system according to the fifteenth embodiment; and FIG. 19(B) is a transverse section of the same.

In a magnetic head 280, as shown, there is disposed a magnetic switching device 284 which is magnetically coupled with cores 281 and 282 and which is wound with a coil 283. Numeral 285 indicates a hard element which is made of a hard material such as glass.

In FIG. 19(A), the cores 281 and 282 have their exposed front portions forming the magnetic gap in the vicinity thereof.

This fifteen embodiment is absolutely the same in the operations and fundamental construction thereof as the fourteenth embodiment but is different therefrom in that the magnetic switching device 284 is arranged at a right angle with respect to the side of the magnetic recording medium.

Incidentally, lead wires, drive coils and output terminals are omitted from the Figures.

[EMBODIMENT 16]

Figure 20A:
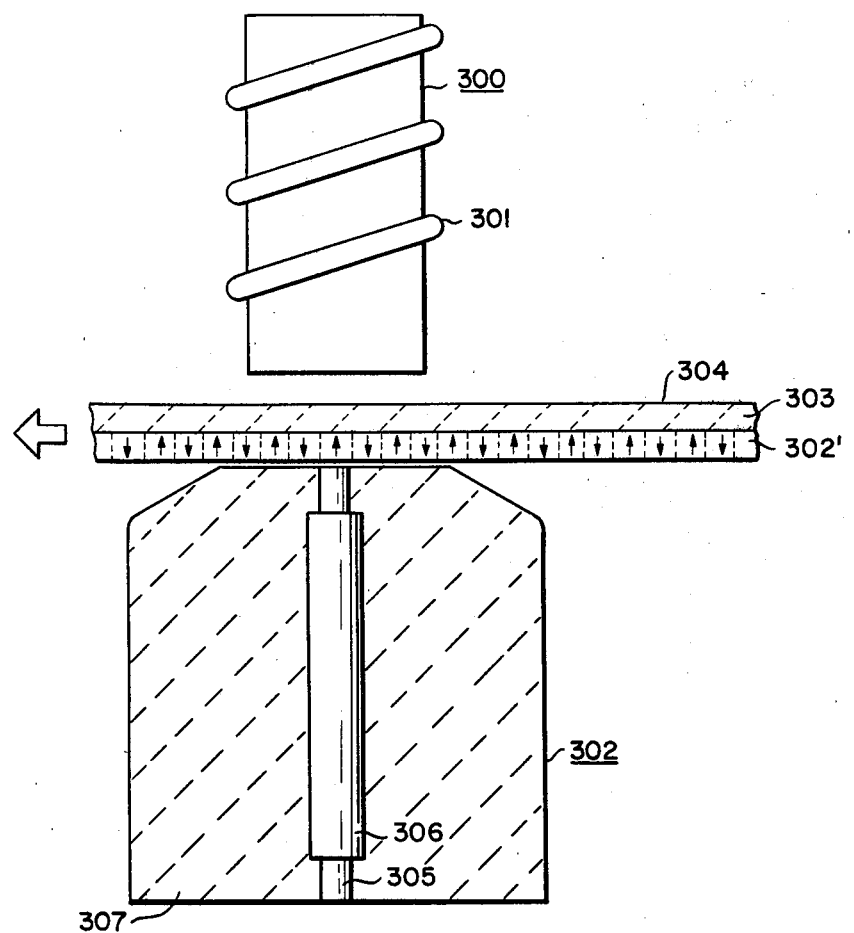
FIG. 20(A) is a top plan view showing a sixteenth embodiment of the present invention.
Figure 20B:
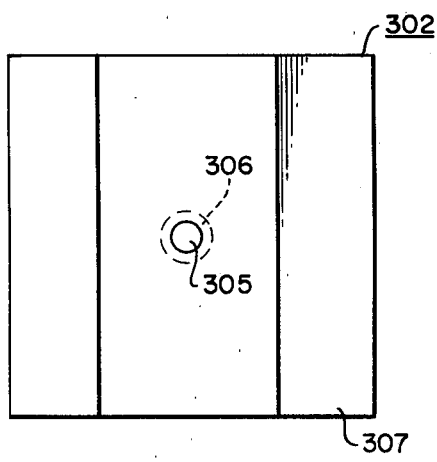
FIG. 20(B) is a side elevation showing the front portion of the same.
Figure 20C:
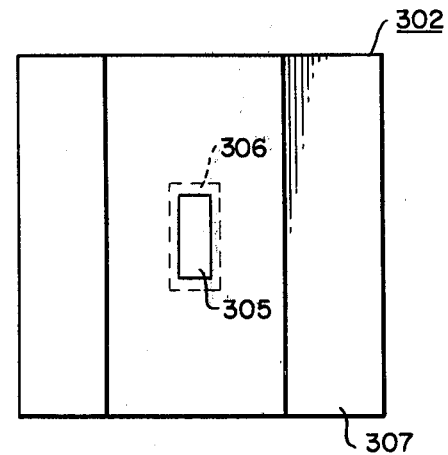
FIG. 20(C) is a side elevation showing the front portion showing another constructional embodiment.

FIG. 20(A) is a side elevation showing the magnetic head of the magnetic recording and reproducing system according to the sixteenth embodiment; and FIG. 20(B) is a front elevation of a main pole; FIG. 20(C) is a modification of the pole of FIG. 20(B).

In the Figures, numeral 300 indicates an auxiliary pole of a perpendicular magnetic recording magnetic head while being wound with an energizing coil 301. Numeral 302 indicates the main pole which has its magnetic switching device 305 arranged to face the auxiliary pole 300. There is interposed between the auxiliary pole 300 and main pole 302, a magnetic recording medium 304 which is composed of a magnetic layer 302' and a base film 303. The magnetic switching device 305 of the main pole 302 is wound with a detecting coil 306. Numeral 307 indicates a head component which is made of a hard material such as glass.

According to this sixteen embodiment, the thin film type magnetic switching device 305 is used as the highly permeable material making the main pole of the perpendicular magnetic recording magnetic head. Therefore, this embodiment can perform not only the perpendicular magnetic recording operation but also the reproduction in response to the perpendicular magnetic recorded signals, as seen from the Figures.

As a result, there can be attained an effect that both the recording and reproducing operations can be effected by the single magnetic head. By feeding the drive current to the energizing coil 301 of the auxiliary pole 300, moreover, the magnetic switching device 305 can be magnetized so that the drive coil described in the third embodiment can be used during the reproduction as the energizing coil 301. Still moreover, the perpendicular magnetized signals can also be reproduced by the energizing coil 301 although the sensitivity is slightly deteriorated. In this instance, the coil 306 can be dispensed with.

Incidentally, FIG. 20(B) shows the example, in which the magnetic switching device 305 having a circular section is used. The operations and effects are substantially retained even if the magnetic switching device having a rectangular section is used, as shown in FIG. 20(C).

[EMBODIMENT 17]

Figure 21B:
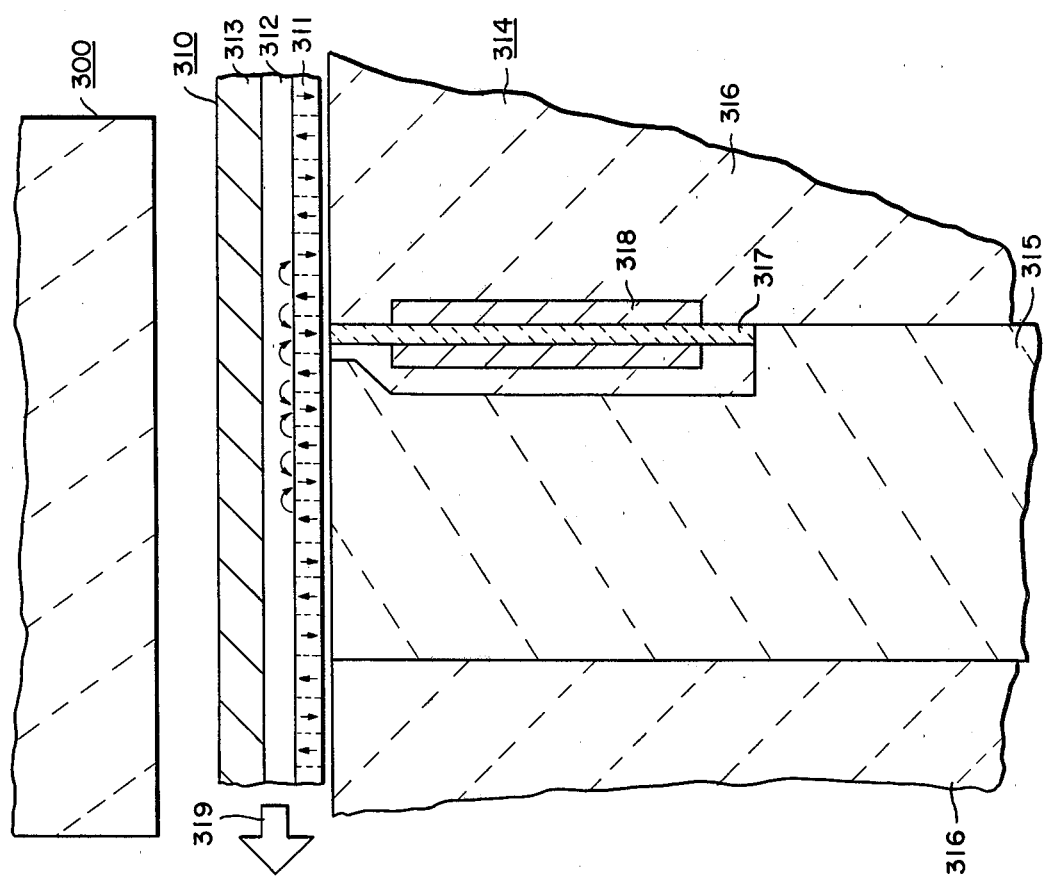
FIG. 21(B) is an enlarged view showing an essential portion of the same.
Figure 21A:
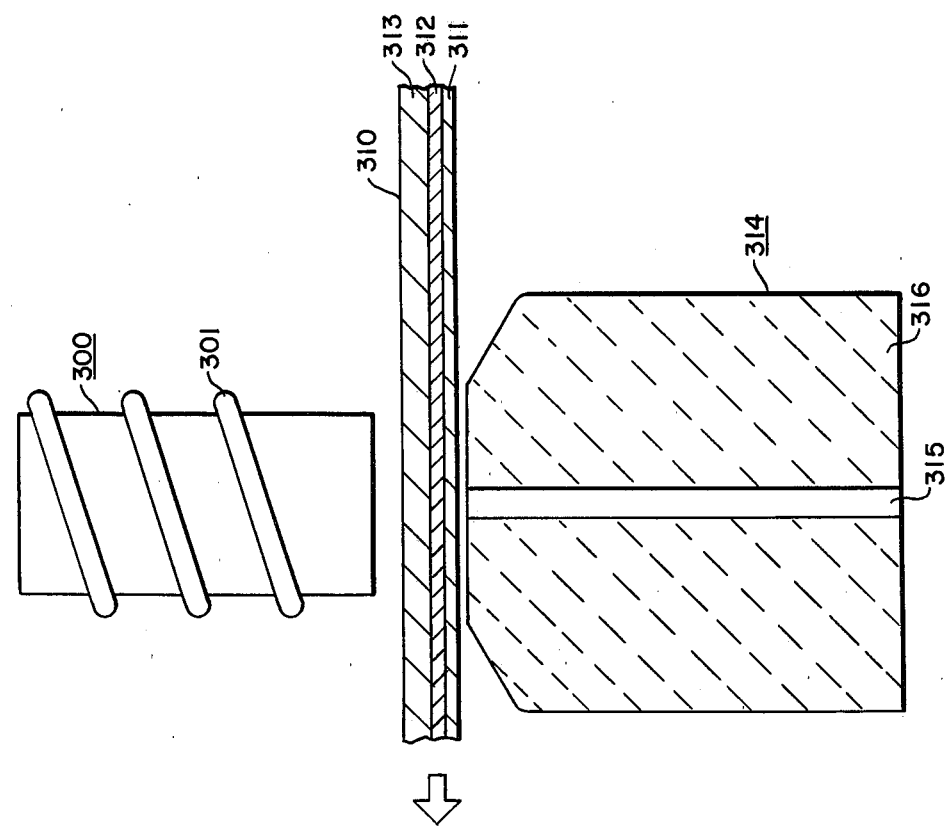
FIG. 21(A) is a top plan view showing a seventeenth embodiment of the present invention.

FIG. 21(A) is an overall view showing the magnetic head of the magnetic recording and reproducing system according to the seventeenth embodiment; and FIG. 21(B) is an enlarged view showing an essential portion of the same.

Those portions corresponding to the constructional components of the sixteenth embodiment are indicated at the same numerals.

As shown, numeral 310 indicates a magnetic recording medium which is composed of a magnetic layer 311, a highly permeable layer 312 and a base film 313. Numeral 314 indicates a main pole portion which has its center portion equipped with a main pole 315 surrounded by a hard material 316 such as glass.

The main pole 315 made of a highly permeable material had its leading end portion equipped with a thin film type magnetic switching device 317, and a closed magnetic path is formed such that the gap is formed at the contacting portion of the magnetic recording medium 310. Consequently, when the magnetic recorded signals, as shown in arrows, of the magnetic layer 311 in FIG. 21(B) arrive, the closed magnetic path is defined by the highly permeable layer 312, the magnetic switching device 317 and the main pole 315, thus remarkably enhancing the sensitivity. When the magnetic switching phenomena take place in the magnetic switching device 317, pulses to be detected are generated in a coil 318. Since, incidentally, the magnetic recording medium 310 is driven to run in the direction of arrow 319, the recording medium is magnetized at the lefthand edge of the main pole 315, as shown in FIG. 21(B), so that the recorded magnetized signals are left as the residual magnetism in the recording medium. As a result, even if the magnetic field at the righthand edge of the main pole is disturbed by the magnetic switching device 317 which is disposed at the righthand end of the main pole 315, no influence is exerted upon the recording operation.

As has been described in detail hereinbefore, according to the present invention, there is provided a magnetic recording and reproducing system, in which such simultaneous inversion phenomena of the magnetic domain, e.g., the Barkhausen effect, as has conventionally been processed as noises in the magnetic head of the magnetic recording and reproducing system and as has been intended to be reduced when in the development of the magnetic recording and reproducing system, is positively utilized to effect the simultaneous inversion of the magnetic domain in an enlarged scale within the magnetic switching device in the magnetic head, i.e., to effect the abrupt change in the magnetic flux, so that this change is converted into the detected signals such as the pulse signals or digital signals by magnetic detecting means. Those detected signals can be easily demodulated into the original recorded signals by the demodulating circuit, as has been described before.

In the conventional magnetic recording and reproducing system, the reproduced signals are generated as continuous analog signals. In the present invention, however, in case the detecting coil is used as the magnetic detecting means, the reproduced signals are generated as the pulse output which is liberated within a short time period, and the switching time is determined by the shape of the magnetic switching device. Therefore, the reproduced signals can be easily discriminated from other noises in respect of the voltage level, frequency component and so on so that the sensitivity can be remarkably enhanced.

On the other hand, in case the magnetic response type magnetic detector such as the Hall element is used as the magnetic detecting means, the reproduced signals can be caught as the abrupt change in voltage when in the magnetic switching operation.

According to the present invention, there is provided a magnetizing circuit for the magnetic switching device so that the direction of magnetization of the magnetic switching device can be arranged and so that the bias magnetic field can be applied. Since, in this case, the detecting capacity can be enhanced, the magnetic inversion can be established even for the weak magnetic field, which is generated by the high density magnetic recorded signals, so that the pulse output voltage having an amplitude sufficient for amplification by an electronic circuit can be generated.

Moreover, since the detected voltage in the magnetic recording and reproducing system of the present invention is not dependent upon the changing rate of the magnetic flux to time, the relative speed between the magnetic recording medium and the magnetic head can be remarkably decreased than that of the high density magnetic recording and reproducing system using the ring type head according to the prior art. If the relative speed between the magnetic recording medium and the magnetic head is decreased, the wear or the like in the magnetic head or the other mechanical drive system can be reduced. In addition, the magnetic head and the magnetic recording medium can be sufficiently brought into contact to reduce the space loss so that the denser recorded signals can be reproduced.

On the other hand, in case the thin film type magnetic switching device is used, the detected output voltage at a level sufficient to be amplified by an electronic circuit can be generated by the smaller magnetic head than the conventional thin film ring head. In other words, the magnetic head can be made smaller and less heavy. This means that the mechanical tracking of the magnetic head can be facilitated to improve the track density more than before.

As has been touched in the foregoing embodiments, moreover, the thin film type magnetic switching device, the detecting coil of thin film metal wiring and the magnetic shield can be produced by a thin film process, such as the evaporation, sputtering and etching processes. This means that the production cost can be lowered by mass-production.

As in the practice of the evaporated films, the recent improvements in the residual magnetic level and the magnetic coercive force of the magnetic recording medium are considerably advantageous for the present invention having relationship with the magnetism inversion energy, so that the density can be increased.

Although the present invention is effective in both the horizontal magnetic recording and the perpendicular magnetic recording, as has been described in the foregoing embodiments, the upper limit to rise in the density can be said the higher, when the system according to the present invention is used for the production of the perpendicular magnetized signals, because the stronger magnetic field can be established for the perpendicular magnetized recording when in the higher density.

In the foregoing embodiments, incidentally, the description has been made by mainly using the magnetic switching device of Wiegand wire or thin film type as one example of the magnetic switching device. However, any magnetic material can naturally be used as the magnetic switching device if it is of the type exhibiting the steep rise in the magnetic permeability for the increase and decrease in the magnetic field in view of the magnetization curve. Moreover, the shape of the magnetic head should not be limited to that shown in the drawings but can take any desired one in accordance with the intended use. Although, still moreover, the magnetic tape is used as the magnetic recording medium in the foregoing embodiments, it goes without saying that another magnetic recording medium such as the magnetic disc, drum or sheet can also be used. Furthermore, although the construction having the detecting coil wound on the magnetic switching device has been disclosed in the foregoing embodiments, the induced pulses can be detected by arranging a single conducting wire in the circumferential portion of a thin film magnetic memory. In case the single conductor is used as the detecting coil, the impedance is lowered. Therefore, the thin film magnetic member and the thin film coil are disposed on the substrate in the magnetic head to thereby provide a booster transformer, and the output of the detecting coil is impressed upon the primary coil so that the higher detected voltage can be generated at the secondary coil.

On the other hand, since the circuit for demodulating the output signals from the magnetic head into the original signals used the detecting coil as magnetic detecting means in the foregoing embodiments, the detected voltage accompanying the magnetic switching phenomena is the positive and negative pulse voltage, and means for detecting the polarity of this pulse voltage is provided to constitute the demodulating circuit. In case, however, the magnetic detector of magnetic flux response type such as the Hall element or the magnetic resistance element is used, abrupt changes in the magnetic flux takes place, when the magnetic switching device is inverted, so that it appears as the level difference in the output voltage in the magnetic detector. In this particular case, therefore, the output polarity detecting means may be replaced by voltage level detecting means to constitute the demodulating circuit.

Furthermore, the magnetic head can also be realized by substituting partially or wholly the magnetic material for the head of the existing ring core, magneto-resistance element and perpendicular magnetization types by the magnetic switching device, as will be quite apparent from the description thus far made.

We claim:

1. A magnetic recording/reproducing system comprising:
   (a) a magnetic switching device adapted to exhibit abrupt magnetic switching phenomena in accordance with the increase in a magnetic field and composed of portions made of a magnetic material and having relatively high and relatively low coercive forces;
   (b) a magnetic head accommodating said magnetic switching element;
   (c) magnetic detecting means disposed within such a range as can receive the magnetic influences from said magnetic switching device;
   (d) magnetizing means disposed within such a range as can receive the magnetic influences from said magnetic switching device; and
   (e) magnetizing signal generating means rendered operative to feed a magnetizing signal to said magnetizing means in response to the signal from said magnetic detecting means,
   whereby the magnetic switching means, which is disposed in said magnetic head for exhibiting the abrupt magnetic switching phenomena in accordance with the increase in the magnetic field, is magnetized by said magnetizing means prior to being driven by said magnetizing signal generating means so that the magnetic switching phenomena may be established in said magnetic switching device in response to the magnetizing signal, said magnetizing signal recorded in a magnetic recording medium facing said magnetic head, and may be extracted as a voltage signal by said magnetic detecting means.

2. A magnetic recording/reproducing system as set forth in claim 1, wherein said magnetic switching device is made of a magnetic thin film which is composed of a layer made of a magnetic material having a relatively high coercive force and a layer made of a magnetic material having a relatively low coercive force.

3. A magnetic recording/reproducing system as set forth in claim 1, wherein a closed magnetic path is established in said magnetic head and defined by said magnetic switching device and a magnetic element while including a gap so that the magnetizing signal of said magnetic recording medium may be detected at the gap portion between said magnetic switching device and said magnetic element.

4. A magnetic recording/reproducing system as set forth in claim 3, wherein said gap is formed with a layer having a high eddy current loss so that it may detect the magnetizing signal of said magnetic recording medium.

5. A magnetic recording/reproducing system as set forth in claim 1, wherein said magnetic head is a perpendicular magnetic recording head having main and auxiliary poles facing each other with respect to said magnetic recording medium such that said main poles are partially composed of said magnetic switching element.

6. A magnetic recording/reproducing system as set forth in claim 1, further comprising temperature detecting means disposed at a low heat resistance portion of said magnetic switching device within said magnetic head.

7. A magnetic recording/reproducing system as set forth in claim 1, wherein said magnetic detecting means includes one of either a detecting coil or a detecting wire.

8. A magnetic recording/reproducing system as set forth in claim 1, wherein said magnetic detecting means includes one of either a magneto-resistance element or a Hall element.

9. A magnetic recording/reproducing system as set forth in claim 1, wherein said magnetic switching device includes a magnetic thin film and is composed of magnetic layers respectively having a relatively high and a relatively low coercive force, and wherein said magnetic detecting means includes a detecting coil and is made of a conductive thin film.

10. A magnetic recording/reproducing system as set forth in claim 1, wherein said magnetizing means includes a coil.

11. A magnetic recording/reproducing system as set forth in claim 8, wherein said magnetizing means includes a detecting coil.

12. A magnetic recording/reproducing system as set forth in claim 5, wherein said magnetizing means includes a coil which is mounted in the auxiliary pole of said perpendicular magnetic recording head.

13. A magnetic recording/reproducing system as set forth in claim 1, further comprising: polarity detecting means for detecting the polarity of the voltage output, which is detected by said magnetic detecting means in response to the simultaneous magnetic switchings of said magnetic switching device; and a flip-flop circuit rendered operative by the output of said polarity detecting means, wherein said magnetic detecting means includes one of either a detecting wire or coil, wherein said flip-flop circuit is set in response to the voltage output of one polarity of said magnetic detecting means and reset in response to the voltage of the other polarity so that the digital signals are demodulated in accordance with the magnetizing signal of said magnetic recording medium.

14. A magnetic recording/reproducing system as set forth in claim 1, wherein the magnetizing current, which continues for a preset time period and which has either the same or opposite polarity as said voltage output, is generated in said magnetizing current generating means in accordance with the voltage output of said magnetic detecting means each time said magnetic switching device is magnetically switched so that it may be fed to said magnetizing means to thereby magnetize said magnetic switching device.

15. A magnetic recording/reproducing system as set forth in claim 1, wherein the polarity of the detected output, which is generated by said magnetic detecting means in response to the simultaneous switchings of the magnetization of said magnetic switching device, is detected by polarity detecting means so that the magnetizing signal generating means is operated by said detected output, wherein the magnetizing current is fed to said magnetizing means thereby to magnetize said magnetic switching device, and wherein the bias current at the opposite polarity to said magnetizing current is fed to said magnetizing means until the detected output at the opposite polarity next to said detected output is generated in said magnetic detecting means.

16. A magnetic recording/reproducing system as set forth in claim 15, further comprising a temperature detecting element disposed in said magnetic head in the vicinity of said magnetic switching device so that the bias current generating means is controlled by the output of said temperature detecting element such that the magnetic field generated by a bias current becomes proportional to the magnetic resisting force of said magnetic switching device.

17. A magnetic recording/reproducing system as set forth in claim 1, wherein a plurality of magnetic switching devices each including a magnetic detecting means and a magnetizing means are arranged in said magnetic head, and wherein the magnetic detecting means of the magnetic switching elements are connected in series so that the detected signal is fed to a demodulating circuit and so that the drive coils of said magnetic switching devices are selected by switching means in accordance with the output of said demodulating circuit.

18. A magnetic recording/reproducing head comprising:
  (a) a thin film type magnetic switching device composed of layers having their easy access of magnetization in the same direction and having relatively high and relatively low coercive forces and adapted to exhibit abrupt magnetic switching phenomena;
  (b) magnetic detecting means disposed within such a range as can receive the magnetic field of said magnetic switching device;
  (c) a substrate for said magnetic switching device, wherein said thin film type magnetic switching device composed of said layers having the relatively high and low coercive forces and adapted to exhibit the abrupt magnetic switching phenomena are formed on said substrate; and
  (d) magnetizing means arranged so as to magnetize said layers in the same direction.

19. A magnetic recording/reproducing head as set forth in claim 18, wherein said magnetic switching device is composed of said magnetic thin film having the relatively low coercive force and formed on said substrate and said magnetic thin film having the relatively high coercive force and formed on said magnetic thin film having said relatively low coercive force.

20. A magnetic recording/reproducing head as set forth in claim 18, wherein said magnetic detecting means includes a thin film coil formed on said substrate.

21. A magnetic recording/reproducing head as set forth in claim 18, wherein a closed magnetic path including a magnetic gap is partially composed of said magnetic switching device.

22. A magnetic recording/reproducing head as set forth in claim 18, wherein a perpendicular recording head composed of main and auxiliary poles facing each other with respect to a magnetic recording medium has its main pole composed either partially or wholly of said magnetic switching device.

23. A magnetic recording/reproducing head as set forth in claim 22, wherein a magnetic path including a magnetic gap is defined by said main pole and said magnetic switching device.

24. A magnetic recording/reproducing head as set forth in claim 22, wherein said magnetic detecting means includes a detecting coil wound around said auxiliary pole.

* * * * *